(12) United States Patent
Tsukano et al.

(10) Patent No.: US 12,049,216 B2
(45) Date of Patent: Jul. 30, 2024

(54) VEHICLE CONTROL METHOD, VEHICLE SYSTEM, AND VEHICLE CONTROL APPARATUS

(71) Applicants: MAZDA MOTOR CORPORATION, Hiroshima (JP); IKUTOKU GAKUEN, Kanagawa (JP)

(72) Inventors: Takatoshi Tsukano, Hiroshima (JP); Shohei Yamada, Hiroshima (JP); Daisuke Umetsu, Hiroshima (JP); Fuminori Kato, Hiroshima (JP); Osamu Sunahara, Hiroshima (JP); Masato Abe, Atsugi (JP); Makoto Yamakado, Atsugi (JP); Yoshio Kano, Atsugi (JP); Kazuki Sato, Hiroshima (JP)

(73) Assignees: MAZDA MOTOR CORPORATION, Hiroshima (JP); IKUTOKU GAKUEN, Kanagawa (JP)

( * ) Notice: Subject to any disclaimer, the term of this patent is extended or adjusted under 35 U.S.C. 154(b) by 750 days.

(21) Appl. No.: 17/273,719

(22) PCT Filed: Sep. 4, 2019

(86) PCT No.: PCT/JP2019/034753
§ 371 (c)(1),
(2) Date: Mar. 4, 2021

(87) PCT Pub. No.: WO2020/054534
PCT Pub. Date: Mar. 19, 2020

(65) Prior Publication Data
US 2021/0316717 A1    Oct. 14, 2021

(30) Foreign Application Priority Data

Sep. 10, 2018  (JP) .................................. 2018-168655

(51) Int. Cl.
*B60W 30/045* (2012.01)
*B60W 10/04* (2006.01)
(Continued)

(52) U.S. Cl.
CPC .......... *B60W 30/045* (2013.01); *B60W 10/04* (2013.01); *B60W 10/18* (2013.01);
(Continued)

(58) Field of Classification Search
CPC ............... B60W 10/04; B60W 30/045; B60W 30/18145; B60W 2520/06; B60W 2540/18
See application file for complete search history.

(56) References Cited

U.S. PATENT DOCUMENTS

2010/0174463 A1* 7/2010 Uragami .............. B60W 40/112
701/70
2012/0179349 A1    7/2012 Yamakado et al.
(Continued)

FOREIGN PATENT DOCUMENTS

JP        5143103 B2    2/2013

OTHER PUBLICATIONS

International Preliminary Report on Patentability and Written Opinion issued in PCT/JP2019/034753; issued Mar. 9, 2021.
(Continued)

*Primary Examiner* — Anshul Sood
(74) *Attorney, Agent, or Firm* — Studebaker & Brackett PC

(57) ABSTRACT

A vehicle control method is applied to a vehicle 1 in which a front wheel 2 is driven by an engine 4, and the method includes a basic torque setting step of setting basic torque to be generated by the engine 4, based on an operational state of the vehicle 1; a deceleration torque setting step of setting deceleration torque, based on an increase in steering angle of
(Continued)

a steering apparatus 5 mounted on the vehicle 1; a torque generation step of controlling the engine 4 so that torque based on the basic torque and the deceleration torque is generated; and a deceleration torque changing step of changing the deceleration torque, based on a vehicle-width-direction mounting position of a steering wheel 6 and an operation direction of the steering wheel 6 when the steering angle is increased. Thus, vehicle posture control is performed in consideration of the vehicle-width-direction mounting position of the steering wheel 6 and the operation direction of the steering wheel 6, so that a driver fatigue reduction effect of the vehicle posture control can be secured appropriately.

15 Claims, 11 Drawing Sheets

(51) Int. Cl.
  *B60W 10/18* (2012.01)
  *B60W 10/20* (2006.01)

(52) U.S. Cl.
  CPC ......... *B60W 10/20* (2013.01); *B60W 2520/06* (2013.01); *B60W 2540/18* (2013.01)

(56) References Cited

U.S. PATENT DOCUMENTS

2014/0222309 A1    8/2014   Yamakado et al.
2017/0129480 A1*   5/2017   Sunahara ........ B60W 30/18145
2017/0305416 A1*   10/2017   Yamakado ................ B60T 7/12

OTHER PUBLICATIONS

International Search Report issued in PCT/JP2019/034753; mailed Nov. 5, 2019.

* cited by examiner

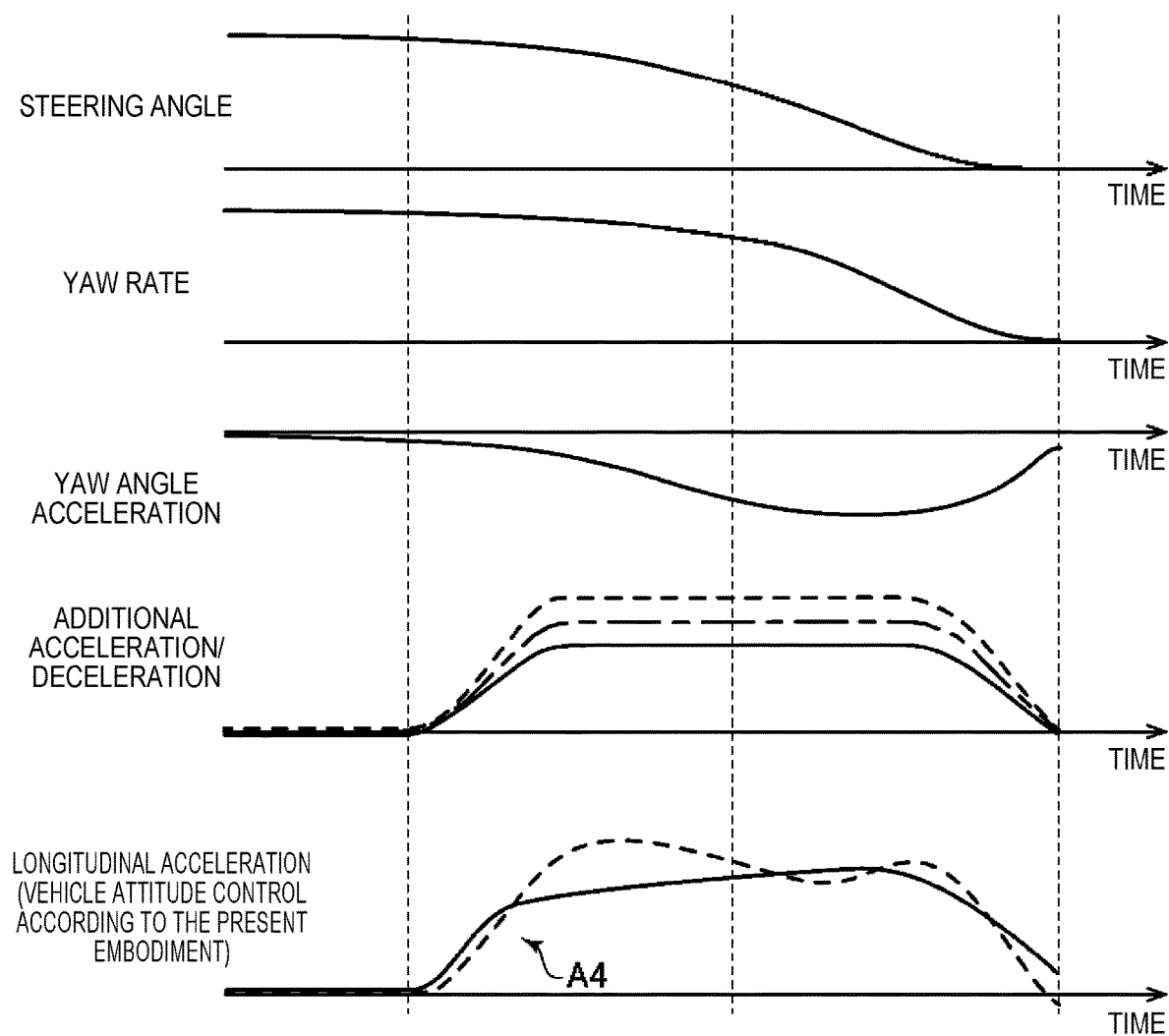

VEHICLE CONTROL METHOD, VEHICLE SYSTEM, AND VEHICLE CONTROL APPARATUS

TECHNICAL FIELD

The present invention relates to a vehicle control method, a vehicle system, and a vehicle control apparatus which control a vehicle posture according to steering.

BACKGROUND ART

A technique has been conventionally known in which, when vehicle behavior becomes unstable due to a slip or the like, the vehicle behavior is controlled in a safe direction (for example, electronic stability control). Specifically, there has been known a technique of detecting the occurrence of understeer or oversteer behavior in the vehicle during, for example, cornering of the vehicle, and giving an appropriate deceleration to wheels so as to suppress such behavior.

On the other hand, apart from the control for improving safety in a traveling state causing the vehicle behavior to become unstable, there has been known a technique of changing torque during the operation of a steering wheel (hereinafter also referred to simply as "steering") to thereby control the vehicle behavior so that the driver's operation during cornering becomes natural and stable (see, for example, Patent Literature 1). Hereinafter, controlling a vehicle posture according to the driver's steering operation as described above will be referred to as "vehicle posture control" as appropriate.

CITATION LIST

Patent Literature

Patent Literature 1: Japanese Patent No. 5143103

SUMMARY OF INVENTION

Technical Problem

Meanwhile, the inventor of the present invention has found that a difference occurs in the longitudinal acceleration generated in the driver seat by the vehicle posture control, according to the vehicle-width-direction mounting position of the driver seat (in other words, the vehicle-width-direction mounting position of the steering) and the turning direction of the vehicle (in other words, the operation direction of the steering). In particular, it has been found that a difference occurs in rising of the longitudinal acceleration in the driver seat by the vehicle posture control (that is, the longitudinal acceleration which the driver feels), according to whether the vehicle is a right-hand drive vehicle or a left-hand drive vehicle and whether the vehicle turns right or left.

Here, the vehicle posture control is assumed to have a configuration of adding deceleration to the vehicle during a turning operation of the steering to thereby control the vehicle posture. In this configuration, when the vehicle turns left, rising of the longitudinal acceleration generated in the driver seat by the vehicle posture control tends to be delayed in the right-hand drive vehicle compared with in the left-hand drive vehicle. This is because when the vehicle turns left, the longitudinal acceleration generated in the driver seat during the turning becomes larger in the right-hand drive vehicle than in the left-hand drive vehicle (typically, acceleration is generated in the right-hand drive vehicle, while deceleration is generated in the left-hand drive vehicle), and thus the longitudinal acceleration in the driver seat when deceleration by the vehicle posture control is applied to such longitudinal acceleration becomes larger in the right-hand drive vehicle than in the left-hand drive vehicle.

On the other hand, when the vehicle turns right, rising of the longitudinal acceleration generated in the driver seat by the vehicle posture control tends to be delayed in the left-hand drive vehicle compared with in the right-hand drive vehicle. This is because when the vehicle turns right, the longitudinal acceleration generated in the driver seat during the turning becomes larger in the left-hand drive vehicle than in the right-hand drive vehicle (typically, acceleration is generated in the left-hand drive vehicle, while deceleration is generated in the right-hand drive vehicle), and thus the longitudinal acceleration in the driver seat when deceleration by the vehicle posture control is applied to such longitudinal acceleration becomes larger in the left-hand drive vehicle than in the right-hand drive vehicle.

Normally, according to the vehicle posture control, an appropriate acceleration or deceleration is added to the vehicle during the steering operation, thereby improving manipulation stability, vehicle responsiveness, and linear feeling with respect to the steering operation. Furthermore, according to such vehicle posture control, an effect of reducing driver's driving fatigue can also be obtained. Specifically, a desired longitudinal acceleration is generated by the vehicle posture control during turning, so that the driver can appropriately prepare for the lateral acceleration that changes due to the turning, that is, the driver can take an appropriate posture with respect to the lateral acceleration in advance, thus reducing driver fatigue.

However, as described above, when a difference occurs in the longitudinal acceleration generated in the driver seat during the vehicle posture control, the driver fatigue reduction effect of the vehicle posture control cannot be secured appropriately. That is, a difference occurs in rising of the longitudinal acceleration generated in the driver seat during the vehicle posture control, in particular, rising of the longitudinal acceleration is delayed, according to the vehicle-width-direction mounting position of the steering wheel (that is, whether the vehicle is a right-hand drive vehicle or a left-hand drive vehicle) and the operation direction of the steering wheel (that is, whether the vehicle turns right or left), so that driver fatigue cannot be appropriately reduced by the vehicle posture control.

The present invention has been made to solve the above-described problem and has an object to provide a vehicle control method, a vehicle system, and a vehicle control apparatus which are capable of, by performing vehicle posture control in consideration of a vehicle-width-direction mounting position of a steering wheel and an operation direction of the steering wheel, appropriately securing a driver fatigue reduction effect of the vehicle posture control.

Solution to Problem

To achieve the above-described object, the present invention is a method for controlling a vehicle in which a front wheel is driven by a prime mover (vehicle control method), which is characterized by including a basic torque setting step of setting basic torque to be generated by the prime mover, based on an operational state of the vehicle; a deceleration torque setting step of setting deceleration torque, based on an increase in steering angle of a steering apparatus mounted on the vehicle; a torque generation step of controlling the prime mover so that torque based on the basic torque and the deceleration torque is generated; and a deceleration torque changing step of changing the deceleration torque, based on a vehicle-width-direction mounting position of a steering wheel of the steering apparatus and an operation direction of the steering wheel when the steering angle is increased.

In the present invention configured as above, when the steering angle of the steering apparatus is increased, that is, the steering wheel is operated to be turned, the deceleration torque for decelerating the vehicle is added, so that the vehicle posture is controlled. In addition, in the present invention, the deceleration torque by the vehicle posture control is changed according to the vehicle-width-direction mounting position of the steering (typically, whether the vehicle is a right-hand drive vehicle or a left-hand drive vehicle) and the operation direction of the steering when the steering angle is increased (in other words, whether the vehicle turns right or left).

Thus, rising of the longitudinal acceleration in the driver seat by the vehicle posture control can be made almost constant irrespective of the mounting position and operation direction of the steering. That is, according to the present invention, a delay of rising of the longitudinal acceleration in the driver seat by the vehicle posture control can be resolved appropriately. From the above, according to the present invention, when the steering angle is increased, linkage (balance) between the longitudinal acceleration and the lateral acceleration which are generated by the vehicle posture control can be secured, and a driver fatigue reduction effect of the vehicle posture control can be secured appropriately.

In the present invention, preferably, the vehicle is a right-hand drive vehicle in which the steering wheel is mounted on a right side relative to a width-direction center of the vehicle, and, in the deceleration torque changing step, when the steering angle is increased, in a case where the steering wheel is operated in a direction of causing the vehicle to turn left, the deceleration torque is increased compared with in a case where the steering wheel is operated in a direction of causing the vehicle to turn right.

According to the present invention configured as above, when the steering angle is increased, the longitudinal acceleration by the vehicle posture control can be appropriately generated in the driver seat of the right-hand drive vehicle.

In the present invention, preferably, the vehicle is a left-hand drive vehicle in which the steering wheel is mounted on a left side relative to a width-direction center of the vehicle, and, in the deceleration torque changing step, when the steering angle is increased, in a case where the steering wheel is operated in a direction of causing the vehicle to turn left, the deceleration torque is reduced compared with in a case where the steering wheel is operated in a direction of causing the vehicle to turn right.

According to the present invention configured as above, when the steering angle is increased, the longitudinal acceleration by the vehicle posture control can be appropriately generated in the driver seat of the left-hand drive vehicle.

In the present invention, preferably, further included is an acceleration torque setting step of setting acceleration torque, based on a reduction in the steering angle of the steering apparatus, wherein in the torque generation step, the prime mover is controlled so that torque based on the basic torque and the acceleration torque is generated.

In the present invention configured as above, when the steering angle of the steering apparatus is reduced, that is, the steering wheel is operated to be returned, the acceleration torque for accelerating the vehicle is added, so that the vehicle posture can be controlled appropriately.

In the present invention, preferably, further included is an acceleration torque changing step of changing the acceleration torque, based on a vehicle-width-direction mounting position of the steering wheel and an operation direction of the steering wheel when the steering angle is reduced.

In the present invention configured as above, the acceleration torque added by the vehicle posture control when the steering angle is reduced is changed according to the vehicle-width-direction mounting position of the steering and the operation direction of the steering. Thus, a delay of rising of the longitudinal acceleration in the driver seat by this vehicle posture control can be resolved appropriately. Accordingly, according to the present invention, when the steering angle is reduced, linkage (balance) between the longitudinal acceleration and the lateral acceleration which are generated by the vehicle posture control can be secured, and the driver fatigue reduction effect of the vehicle posture control can be secured appropriately.

In the present invention, preferably, the vehicle is a right-hand drive vehicle in which the steering wheel is mounted on a right side relative to a width-direction center of the vehicle, and, in the acceleration torque changing step, when the steering angle is reduced, in a case where the steering wheel is operated in a direction of causing the vehicle to turn left, the acceleration torque is reduced compared with in a case where the steering wheel is operated in a direction of causing the vehicle to turn right.

According to the present invention configured as above, when the steering angle is reduced, the longitudinal acceleration by the vehicle posture control can be appropriately generated in the driver seat of the right-hand drive vehicle.

In the present invention, preferably, the vehicle is a left-hand drive vehicle in which the steering wheel is mounted on a left side relative to a width-direction center of the vehicle, and, in the acceleration torque changing step, when the steering angle is reduced, in a case where the steering wheel is operated in a direction of causing the vehicle to turn left, the acceleration torque is increased compared with in a case where the steering wheel is operated in a direction of causing the vehicle to turn right.

According to the present invention configured as above, when the steering angle is reduced, the longitudinal acceleration by the vehicle posture control can be appropriately generated in the driver seat of the left-hand drive vehicle.

In another aspect, to achieve the above-described object, the present invention is a method for controlling a vehicle including a braking apparatus that adds braking torque to a wheel (vehicle control method), which is characterized by including a deceleration torque setting step of setting deceleration torque, based on an increase in steering angle of a steering apparatus mounted on the vehicle; a torque generation step of controlling the braking apparatus so that braking torque based on the deceleration torque is generated; and a deceleration torque changing step of changing the deceleration torque, based on a vehicle-width-direction mounting position of a steering wheel of the steering apparatus and an operation direction of the steering wheel when the steering angle is increased.

Furthermore, in another aspect, to achieve the above-described object, the present invention is a system for controlling a vehicle (vehicle system), which is characterized by including a prime mover that drives a front wheel of the vehicle, a steering apparatus including a steering wheel for steering the vehicle, a steering angle sensor that detects a steering angle of the steering apparatus, an operational state sensor that detects an operational state of the vehicle, and a controller that controls the prime mover, wherein the controller is configured to set basic torque to be generated by the prime mover, based on the operational state detected by the operational state sensor; set deceleration torque, based on an increase in the steering angle detected by the steering angle sensor; control the prime mover so that torque based on the basic torque and the deceleration torque is generated; and change the deceleration torque, based on a vehicle-width-direction mounting position of the steering wheel and an operation direction of the steering wheel when the steering angle is increased.

Furthermore, in another aspect, to achieve the above-described object, the present invention is a system for controlling a vehicle (vehicle system), which is characterized by including a braking apparatus that adds braking torque to a wheel of the vehicle, a steering apparatus including a steering wheel for steering the vehicle, a steering angle sensor that detects a steering angle of the steering apparatus, and a controller that controls the braking apparatus, wherein the controller is configured to set deceleration torque, based on an increase in the steering angle detected by the steering angle sensor; control the braking apparatus so that braking torque based on the deceleration torque is generated; and change the deceleration torque, based on a vehicle-width-direction mounting position of the steering wheel and an operation direction of the steering wheel when the steering angle is increased.

Furthermore, in another aspect, to achieve the above-described object, the present invention is an apparatus for controlling a vehicle including a steering apparatus including a steering wheel, and configured as a right-hand drive vehicle in which this steering wheel is mounted on a right side relative to a width-direction center of the vehicle (vehicle control apparatus), which is characterized by including vehicle posture control means that adds, when a steering angle of the steering apparatus is increased, deceleration to the vehicle to thereby control a vehicle posture; and deceleration changing means that changes the deceleration to be added by the vehicle posture control means, based on an operation direction of the steering wheel when the steering angle is increased.

Furthermore, in another aspect, to achieve the above-described object, the present invention is an apparatus for controlling a vehicle including a steering apparatus including a steering wheel, and configured as a left-hand drive vehicle in which this steering wheel is mounted on a left side relative to a width-direction center of the vehicle (vehicle control apparatus), which is characterized by including vehicle posture control means that adds, when a steering angle of the steering apparatus is increased, deceleration to the vehicle to thereby control a vehicle posture; and deceleration changing means that changes the deceleration to be added by the vehicle posture control means, based on an operation direction of the steering wheel when the steering angle is increased.

The driver fatigue reduction effect of the vehicle posture control can also be appropriately secured by the present invention according to the above-described other aspects.

Advantageous Effect of Invention

According to the vehicle control method, the vehicle system, and the vehicle control apparatus in the present invention, the vehicle posture control is performed in consideration of the vehicle-width-direction mounting position of the steering wheel and the operation direction of the steering wheel, so that the driver fatigue reduction effect of the vehicle posture control can be secured appropriately.

BRIEF DESCRIPTION OF DRAWINGS

FIG. 16 is a time chart illustrating results in the case of performing second vehicle posture control according to the embodiment of the present invention.

DESCRIPTION OF EMBODIMENT

Hereinafter, a vehicle control method, a vehicle system, and a vehicle control apparatus according to an embodiment of the present invention will be described with reference to the attached drawings.

Configuration of Vehicle

Figure 1:
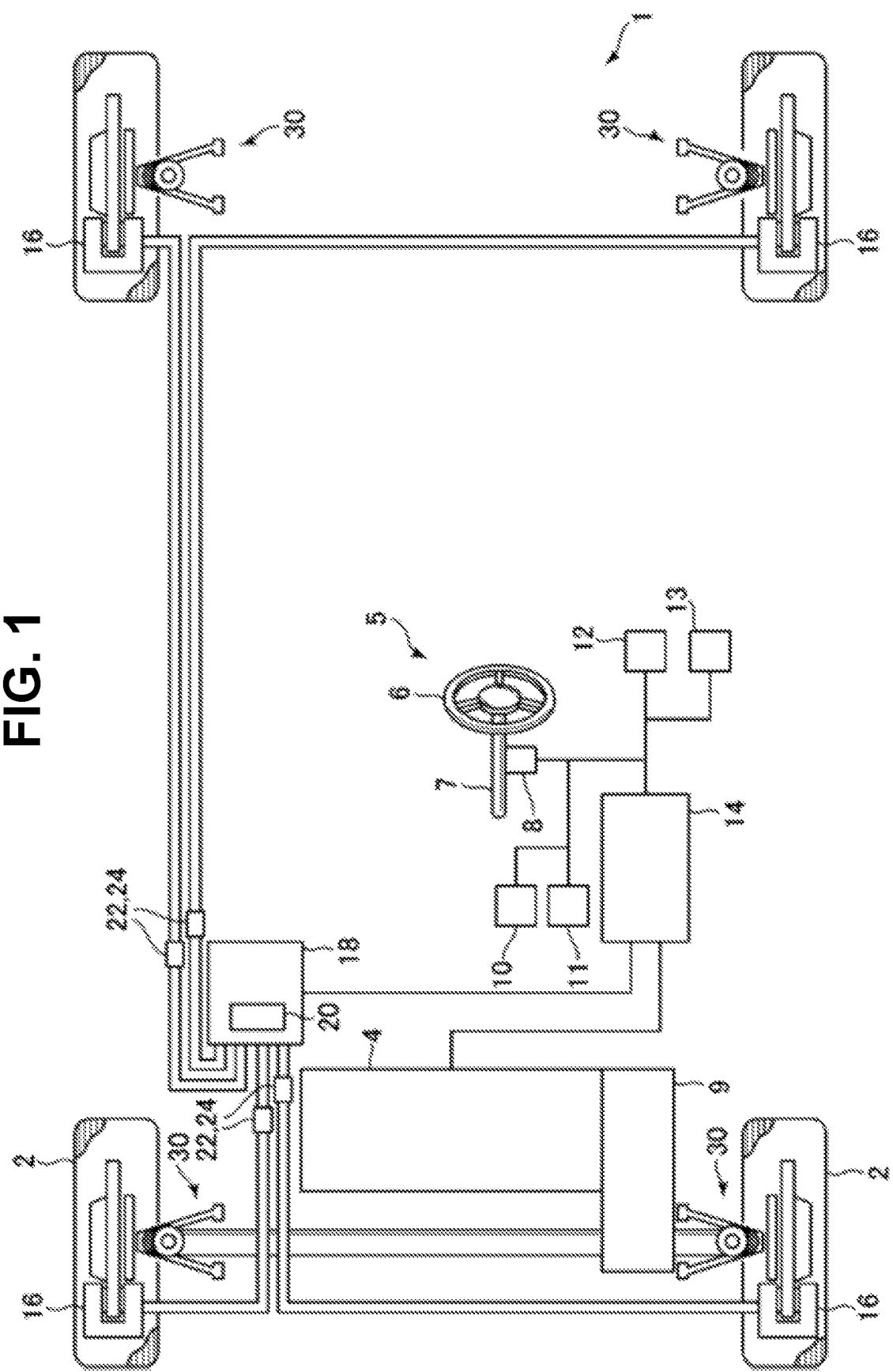
FIG. 1 is a block diagram schematically illustrating an overall configuration of a vehicle according to an embodiment of the present invention.

First, a vehicle to which the vehicle control method, the vehicle system, and the vehicle control apparatus according to the embodiment of the present invention are applied will be described with reference to FIGS. 1 and 2. FIG. 1 is a block diagram schematically illustrating an overall configuration of the vehicle according to the embodiment of the present invention, and FIG. 2 is a block diagram illustrating an electrical configuration of the vehicle according to the embodiment of the present invention.

As illustrated in FIG. 1, an engine 4 which is a prime mover that drives left and right front wheels 2 (drive wheels) is mounted on a vehicle body front portion of a vehicle 1. This vehicle 1 is configured as a so-called FF vehicle. Each wheel of the vehicle 1 is suspended from the vehicle body via a suspension 30 including an elastic member (typically, a spring), a suspension arm, and the like.

Figure 2:
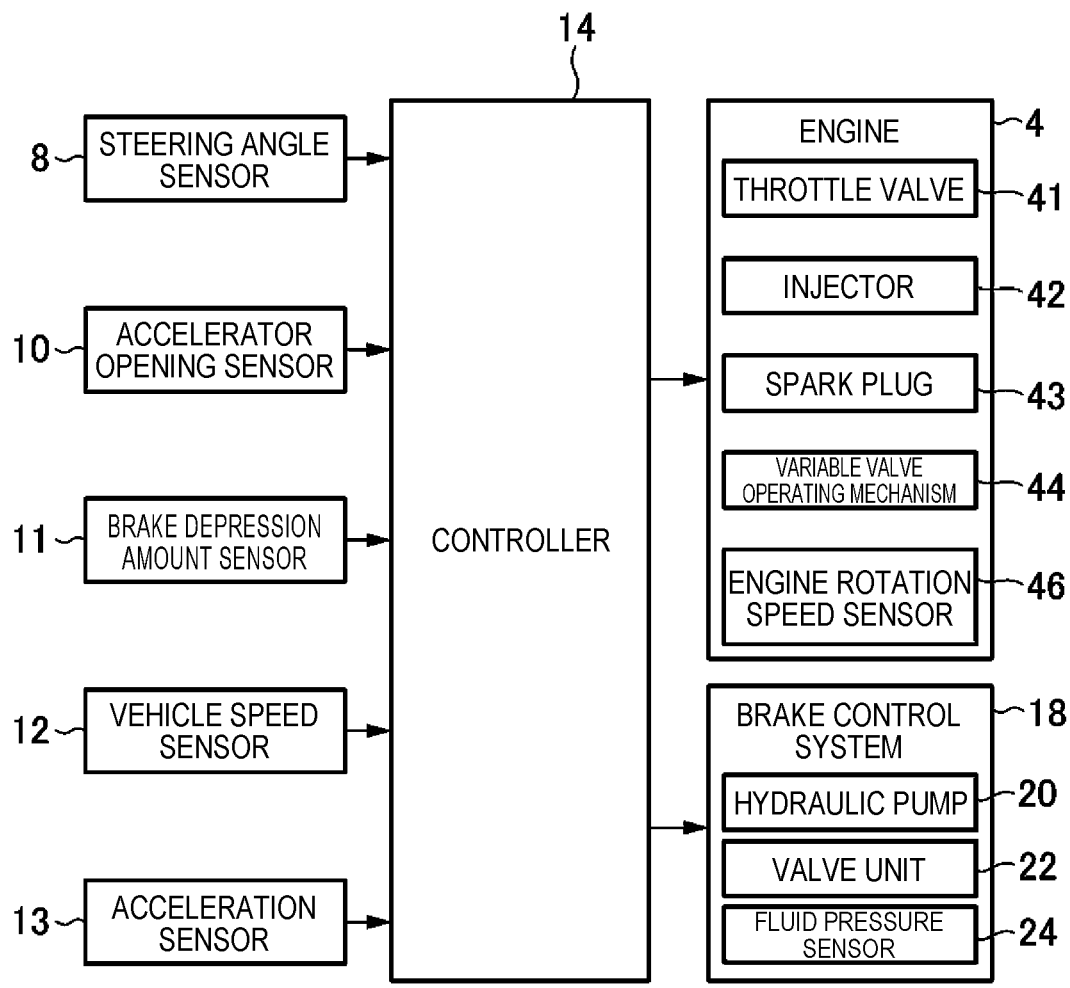
FIG. 2 is a block diagram illustrating an electrical configuration of the vehicle according to the embodiment of the present invention.

The engine 4 is an internal combustion engine such as a gasoline engine or a diesel engine, and in the present embodiment, the engine 4 is a gasoline engine having a spark plug 43 (see FIG. 2). A force is transmitted between the engine 4 and the front wheels 2 via a transmission 9, and the engine 4 is controlled by a controller 14. The engine 4 has a throttle valve 41 that adjusts an intake air amount, an injector 42 that injects fuel, the spark plug 43, a variable valve operating mechanism 44 that changes opening and closing timings of intake and exhaust valves, and an engine rotation speed sensor 46 that detects a rotation speed of the engine 4 (see FIG. 2). The engine rotation speed sensor 46 outputs a detection value thereof to the controller 14.

Furthermore, the vehicle 1 has a steering apparatus 5 including a steering wheel 6 (hereinafter also referred to simply as "steering 6"), a steering column 7, and the like, a steering angle sensor 8 that detects a steering angle of the steering apparatus 5 from a rotation angle of the steering column 7, a position of a steering rack (not illustrated), and the like, an accelerator opening sensor 10 that detects an accelerator pedal depression amount corresponding to an opening of an accelerator pedal, a brake depression amount sensor 11 that detects a depression amount of a brake pedal, a vehicle speed sensor 12 that detects a vehicle speed, and an acceleration sensor 13 that detects acceleration. The accelerator opening sensor 10, the vehicle speed sensor 12, and the like correspond to an operational state sensor that detects an operational state of the vehicle 1. Each sensor outputs a detection value thereof to the controller 14. This controller 14 is configured to include, for example, a powertrain control module (PCM).

Furthermore, the vehicle 1 includes a brake control system 18 that supplies a brake fluid pressure to a brake caliper of a brake apparatus (braking apparatus) 16 provided in each wheel. The brake control system 18 includes a hydraulic pump 20 that generates a brake fluid pressure required to generate braking torque in the brake apparatus 16 provided in each wheel, a valve unit 22 (specifically, a solenoid valve) which is provided in a fluid pressure supply line to the brake apparatus 16 of each wheel and controls the fluid pressure to be supplied from the hydraulic pump 20 to the brake apparatus 16 of each wheel, and a fluid pressure sensor 24 that detects the fluid pressure to be supplied from the hydraulic pump 20 to the brake apparatus 16 of each wheel. The fluid pressure sensor 24 is disposed, for example, at a connection portion between each valve unit 22 and the fluid pressure supply line downstream thereof, detects the fluid pressure downstream of each valve unit 22, and outputs a detection value to the controller 14.

The brake control system 18 calculates fluid pressures to be independently supplied to a wheel cylinder and the brake caliper in each wheel, based on a braking torque instruction value input from the controller 14 and the detection value of the fluid pressure sensor 24, and controls a rotation speed of the hydraulic pump 20 and an opening of the valve unit 22 according to the fluid pressures.

Next, as illustrated in FIG. 2, the controller 14 according to the present embodiment outputs control signals to control, for example, each unit of the engine 4 (for example, a turbosupercharger and an EGR apparatus other than the throttle valve 41, the injector 42, the spark plug 43, and the variable valve operating mechanism 44) and the hydraulic pump 20 and the valve unit 22 in the brake control system 18, based on, other than detection signals of the above-described sensors 8, 10, 11, 12, and 13, detection signals output from various sensors that detect the operational state of the vehicle 1.

The controller 14 (which may also include the brake control system 18) is constituted by a computer including one or more processors, various programs which are interpreted and executed on the processors (including a basic control program such as an OS and an application program that is activated on the OS to implement a specific function), and an internal memory such as a ROM or a RAM for storing the programs and various data.

The controller 14 corresponds to a "controller" in the present invention. Furthermore, a system including the engine 4, the steering apparatus 5, the steering angle sensor 8, the accelerator opening sensor 10, the vehicle speed sensor 12, the brake apparatus 16, and the controller 14 corresponds to the "vehicle system" in the present invention. Furthermore, the controller 14 corresponds to the "vehicle control apparatus" in the present invention and functions as "vehicle posture control means" and "deceleration changing means."

Vehicle Posture Control

Next, vehicle posture control according to the embodiment of the present invention will be described.

Overall Processing

Figure 3:
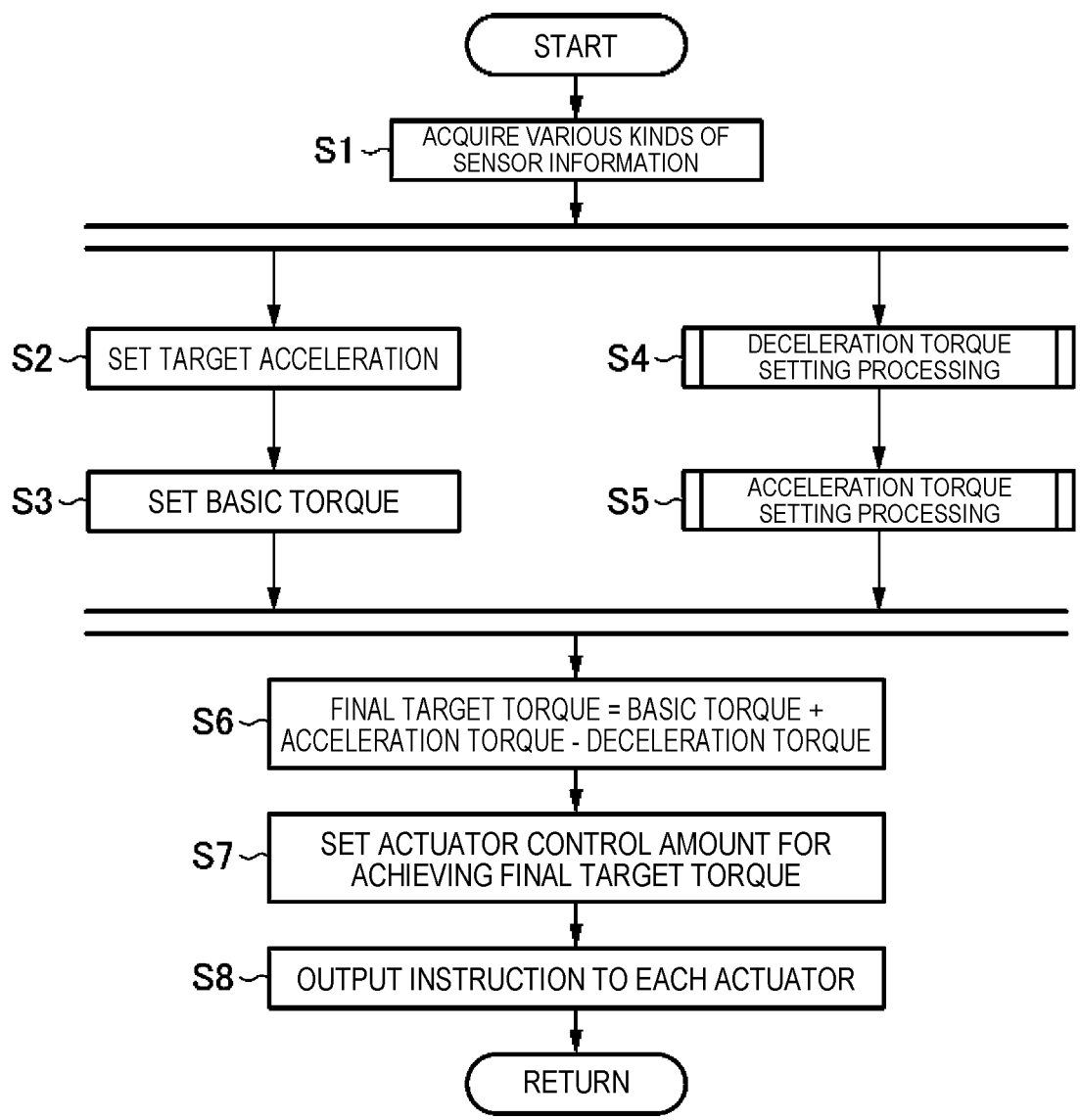
FIG. 3 is a flowchart of vehicle posture control processing according to the embodiment of the present invention.

First, an overall flow of this vehicle posture control will be described with reference to FIG. 3. FIG. 3 is a flowchart of vehicle posture control processing according to the embodiment of the present invention.

The vehicle posture control processing of FIG. 3 is initiated when an ignition of the vehicle 1 is turned on and the power is supplied to the vehicle system, and is repeatedly executed at a predetermined cycle (for example, 50 ms).

When the vehicle posture control processing is started, as illustrated in FIG. 3, in step S1, the controller 14 acquires various kinds of sensor information on the operational state of the vehicle 1. Specifically, the controller 14 acquires, as the information on the operational state, the detection signals output by the above-described various sensors including the steering angle detected by the steering angle sensor 8, the accelerator opening detected by the accelerator opening sensor 10, the brake pedal depression amount detected by the brake depression amount sensor 11, the vehicle speed detected by the vehicle speed sensor 12, the acceleration detected by the acceleration sensor 13, the fluid pressure detected by the fluid pressure sensor 24, the engine rotation speed detected by the engine rotation speed sensor 46, a gear stage currently set in the transmission 9 of the vehicle 1, and the like.

Next, in step S2, the controller 14 sets target acceleration (which includes not only positive acceleration but also negative acceleration (deceleration), and the same applies to the following) based on the operational state of the vehicle 1 which is acquired in step S1. Specifically, when the accelerator pedal is operated, the controller 14 typically sets positive target acceleration. In this case, the controller 14 selects, from among acceleration characteristic maps (created in advance and stored in a memory or the like) each defining various vehicle speeds and various gear stages, an acceleration characteristic map corresponding to the current vehicle speed and gear stage, and refers to the selected acceleration characteristic map to set the positive target acceleration corresponding to the current accelerator opening. On the other hand, when the brake pedal is operated, the controller 14 typically sets negative target acceleration. For example, the controller 14 sets the negative target acceleration based on the brake pedal depression amount.

Next, in step S3, the controller 14 determines basic torque for achieving the target acceleration set in step S2. This basic torque includes driving torque generated by the engine 4 for driving the vehicle 1 (positive torque), and braking torque generated by the brake apparatus 16 for braking the vehicle 1 (negative torque). When the positive target acceleration is set in step S2, the controller 14 sets the driving torque of the engine 4 as the basic torque in principle. In this case, the controller 14 determines the basic torque within a range of torque which can be output by the engine 4, based on the current vehicle speed, gear stage, road surface slope, road surface μ, and the like. In contrast, when the negative target acceleration (deceleration) is set in step S2, the controller 14 sets the braking torque generated by the brake apparatus 16 as the basic torque in principle.

Furthermore, in parallel with the processing of steps S2 and S3, in step S4, the controller 14 executes deceleration torque setting processing in which torque for adding deceleration to the vehicle 1 (deceleration torque) is set based on a steering operation. In this step S4, the controller 14 sets the deceleration torque for reducing the basic torque, according to an increase in the steering angle of the steering apparatus 5, that is, according to a turning operation of the steering 6. In the present embodiment, when the steering 6 is operated to be turned, the controller 14 controls the vehicle posture by adding the deceleration to the vehicle 1. Hereinafter, such vehicle posture control implemented when the steering 6 is turned will be referred to as "first vehicle posture control" as appropriate. The deceleration torque setting processing will be described later in detail.

Next, in step S5, the controller 14 executes acceleration torque setting processing in which torque for adding acceleration to the vehicle 1 (acceleration torque) is set based on a steering operation. In this step S5, the controller 14 sets the acceleration torque for increasing the basic torque, according to a reduction in the steering angle of the steering apparatus 5, that is, according to returning of the steering 6. In the present embodiment, when the steering 6 is operated to be returned, the controller 14 controls the vehicle posture by adding the acceleration to the vehicle 1. Hereinafter, such vehicle posture control implemented when the steering 6 is returned will be referred to as "second vehicle posture control" as appropriate. Typically, this second vehicle posture control tends to be implemented after the above-described first vehicle posture control. The acceleration torque setting processing will be described later in detail.

After execution of the processing of steps S2 and S3, the deceleration torque setting processing of step S4, and the acceleration torque setting processing of step S5, in step S6, the controller 14 sets final target torque based on the basic torque set in step S3, the deceleration torque set in step S4, and the acceleration torque set in step S5. Basically, the controller 14 calculates the final target torque by adding the acceleration torque to the basic torque or by subtracting the deceleration torque from the basic torque.

Next, in step S7, the controller 14 sets an actuator control amount for achieving the final target torque set in step S6. Specifically, the controller 14 determines various state amounts required to achieve the final target torque, based on the final target torque set in step S6, and sets the control amount of each actuator that drives each component of the engine 4, based on the state amounts. In this case, the controller 14 sets a restriction value or range with respect to each state amount, and sets the control amount of each actuator to allow the state value to preserve restriction due to the restriction value or range. Subsequently, in step S8, the controller 14 outputs a control instruction to each actuator, based on the control amount set in step S7.

Specifically, in step S8, when the final target torque is set by subtracting the deceleration torque from the basic torque in step S6, that is, when the first vehicle posture control is executed, the controller 14 retards the ignition timing of the spark plug 43 compared with the ignition timing at which the basic torque is generated. Instead of or in addition to the retard of the ignition timing, the controller 14 reduces the intake air amount by reducing the throttle opening or retarding the close timing of the intake valve set after bottom dead center. In this case, the controller 14 reduces the fuel injection amount of the injector 42 according to an decrease in the intake air amount so that a predetermined air-fuel ratio is maintained.

On the other hand, when the final target torque is set by adding the acceleration torque to the basic torque in step S6, that is, when the second vehicle posture control is executed, the controller 14 advances the ignition timing of the spark plug 43 compared with the ignition timing at which the basic torque is generated. Instead of or in addition to the advance of the ignition timing, the controller 14 increases the intake air amount by increasing the throttle opening or advancing the close timing of the intake valve set after the bottom dead center. In this case, the controller 14 increases the fuel injection amount of the injector 42 according to the increase in the intake air amount so that a predetermined air-fuel ratio is maintained.

After step S8 as above, the controller 14 ends the vehicle posture control processing.

Deceleration Torque Setting Processing

Figure 4:
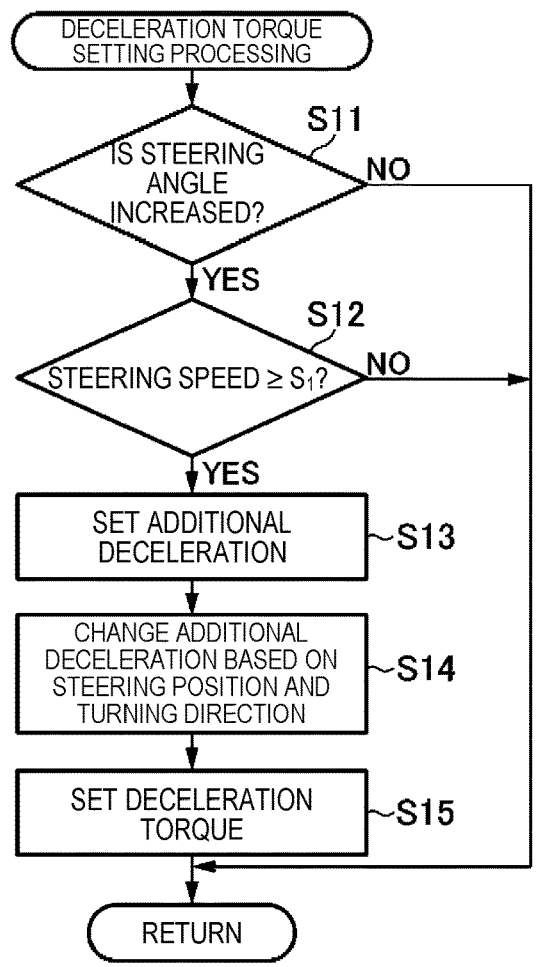
FIG. 4 is a flowchart of deceleration torque setting processing according to the embodiment of the present invention.

Next, the deceleration torque setting processing according to the embodiment of the present invention will be described with reference to FIGS. 4 and 5. FIG. 4 is a flowchart of the deceleration torque setting processing according to the embodiment of the present invention, and FIG. 5 is a map illustrating a relationship between additional deceleration and a steering speed according to the embodiment of the present invention.

When the deceleration torque setting processing is started, in step S11, the controller 14 determines whether the steering angle (absolute value) of the steering apparatus 5 is increased (that is, whether the turning operation of the steering 6 is being performed). As a result, when the steering angle is increased (Yes in step S11), the controller 14 proceeds to step S12 and determines whether the steering speed is equal to or more than a predetermined threshold $S_1$. That is, the controller 14 calculates the steering speed based on the steering angle acquired from the steering angle sensor 8 in step S1 of FIG. 3 and determines whether the value is equal to or more than the threshold $S_1$.

As a result, when the steering speed is equal to or more than the threshold $S_1$ (Yes in step S12), the controller 14 proceeds to step S13 and sets the additional deceleration based on the steering speed. This additional deceleration is a deceleration to be added to the vehicle 1 according to the steering operation in order to control the vehicle posture in line with the driver's intention.

Figure 5:
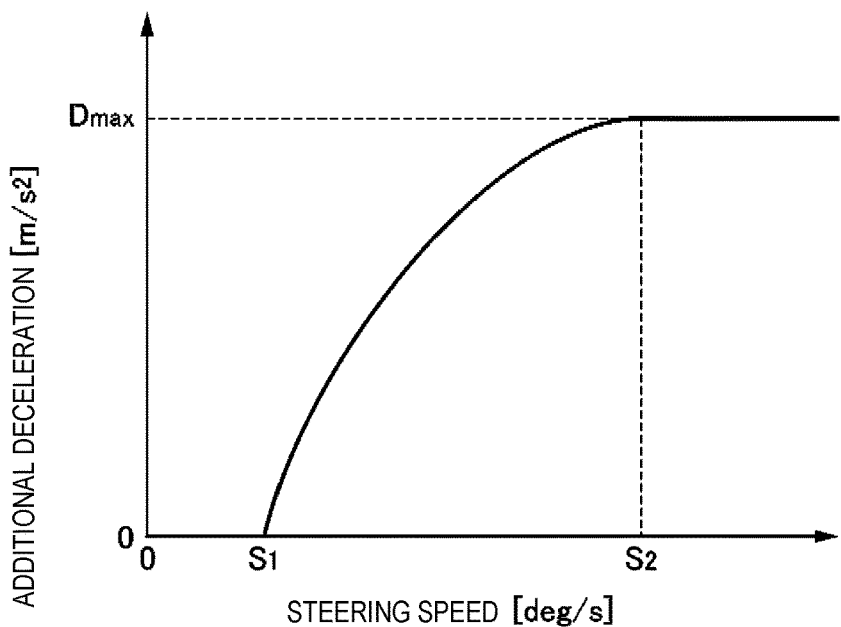
FIG. 5 is a map illustrating a relationship between additional deceleration and a steering speed according to the embodiment of the present invention.

Specifically, the controller 14 sets the additional deceleration corresponding to the steering speed calculated in step S12, based on the relationship between the additional deceleration and the steering speed which is illustrated in the map of FIG. 5. In FIG. 5, the horizontal axis indicates the steering speed and the vertical axis indicates the additional deceleration. As illustrated in FIG. 5, when the steering speed is equal to or less than the threshold $S_1$, the corresponding additional deceleration is 0. That is, when the steering speed is equal to or less than the threshold $S_1$, the controller 14 does not execute the control for adding the deceleration to the vehicle 1 based on the steering operation.

On the other hand, when the steering speed exceeds the threshold $S_1$, the additional deceleration corresponding to this steering speed gradually approximates a predetermined upper limit value $D_{max}$ along with the increase in the steering speed. That is, as the steering speed increases, the additional deceleration increases, and an increase rate of the increase amount decreases. This upper limit value $D_{max}$ is set to deceleration at which the driver does not feel control intervention even when the deceleration is added to the vehicle 1 according to the steering operation (for example, 0.5 m/s$^2$≈0.05 G). Furthermore, when the steering speed is equal to or more than a threshold $S_2$ larger than the threshold $S_1$, the additional deceleration is maintained at the upper limit value $D_{max}$.

Next, in step S14, the controller 14 changes the additional deceleration set in step S13, according to the vehicle-width-direction mounting position of the steering 6 (that is, whether the vehicle 1 is a right-hand drive vehicle or a left-hand drive vehicle) and the operation direction of the steering 6 when the steering angle is increased (that is, whether the vehicle 1 turns right or left). Here, the reason why the additional deceleration is thus changed will be described with reference to FIGS. 6 and 7.

Figure 6:
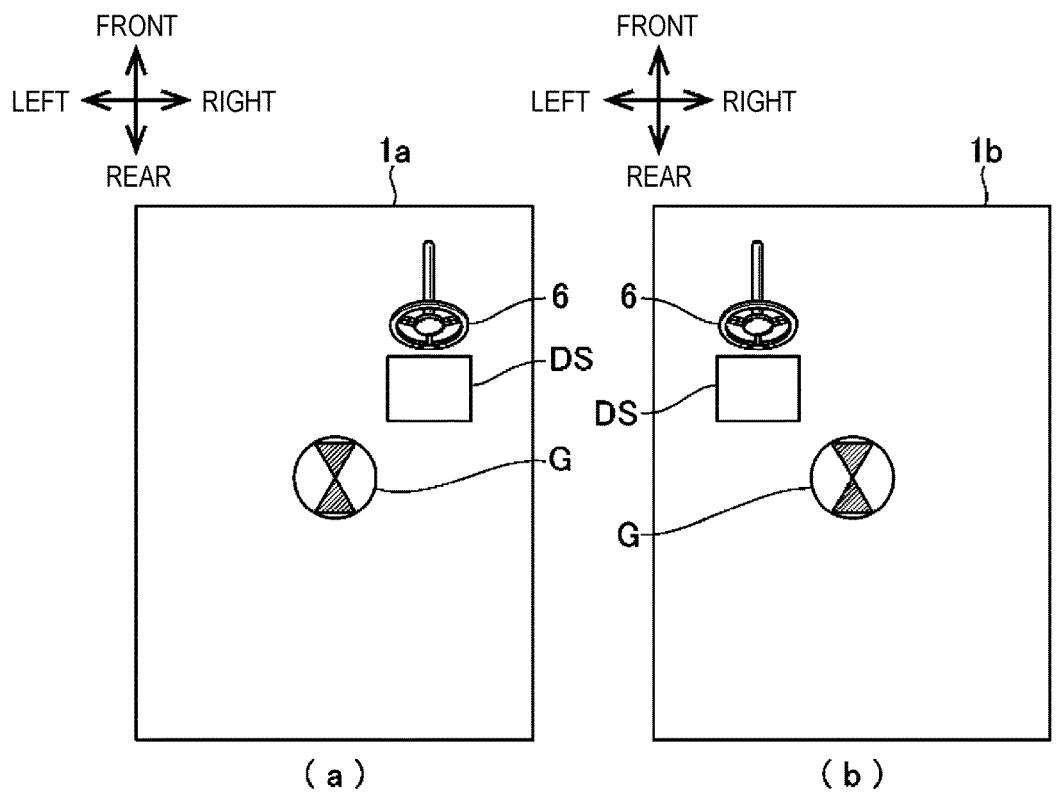
FIG. 6 is a schematic plan view of a right-hand drive vehicle and a left-hand drive vehicle.

FIG. 6 is a schematic plan view of a right-hand drive vehicle and a left-hand drive vehicle. In chart (a) of FIG. 6, the vehicle denoted by reference character 1a is the right-hand drive vehicle in which the steering 6 and a driver seat DS are mounted on the right side relative to the vehicle-width-direction center (corresponding to a center-of-gravity position G). On the other hand, in chart (b) of FIG. 6, the vehicle denoted by reference character 1b is the left-hand drive vehicle in which the steering 6 and a driver seat DS are mounted on the left side relative to the vehicle-width-direction center (corresponding to a center-of-gravity position G).

Figure 7:
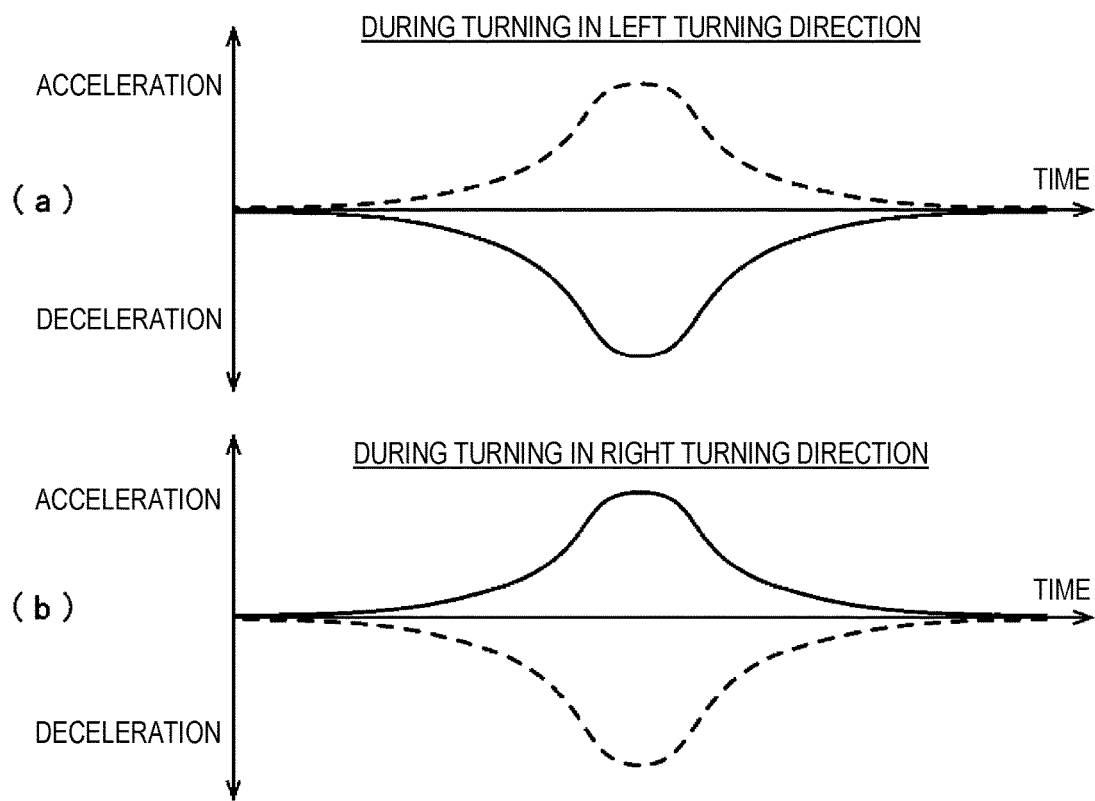
FIG. 7 is an explanatory view of longitudinal acceleration generated in a driver seat during steering turning.

FIG. 7 illustrates an example of longitudinal acceleration generated in the driver seat DS when the steering 6 is turned. Chart (a) of FIG. 7 illustrates longitudinal acceleration (solid line) generated in the driver seat DS of the left-hand drive vehicle and longitudinal acceleration (broken line) generated in the driver seat DS of the right-hand drive vehicle, during steering turning in the left turning direction. Chart (b) of FIG. 7 illustrates longitudinal acceleration (solid line) generated in the driver seat DS of the left-hand drive vehicle and longitudinal acceleration (broken line) generated in the driver seat DS of the right-hand drive vehicle, during steering turning in the right turning direction.

As illustrated in charts (a) and (b) of FIG. 7, the longitudinal acceleration generated in the driver seat DS changes according to whether the vehicle 1 is a right-hand drive vehicle or a left-hand drive vehicle and whether the vehicle 1 turns right or left. Specifically, as illustrated in chart (a) of FIG. 7, when the vehicle 1 turns left, the longitudinal acceleration generated in the driver seat DS during the turning becomes larger in the right-hand drive vehicle than in the left-hand drive vehicle. Specifically, acceleration is generated in the right-hand drive vehicle, while deceleration is generated in the left-hand drive vehicle. In contrast, as illustrated in chart (b) of FIG. 7, when the vehicle 1 turns right, the longitudinal acceleration generated in the driver seat DS during the turning becomes larger in the left-hand drive vehicle than in the right-hand drive vehicle. Specifically, acceleration is generated in the left-hand drive vehicle, while deceleration is generated in the right-hand drive vehicle.

Accordingly, when the vehicle posture control in which the deceleration is added when the steering 6 is turned (first vehicle posture control) is executed, a difference occurs in rising of the longitudinal acceleration generated in the driver seat DS by this first vehicle posture control, according to whether the vehicle 1 is a right-hand drive vehicle or a left-hand drive vehicle and whether the vehicle 1 turns right or left. Specifically, when the vehicle 1 turns left, the longitudinal acceleration in the driver seat DS becomes larger in the right-hand drive vehicle than in the left-hand drive vehicle (see chart (a) of FIG. 7), and thus, when the additional deceleration by the first vehicle posture control is applied to this longitudinal acceleration, rising of the longitudinal acceleration in the driver seat DS by the control tends to be delayed in the right-hand drive vehicle compared with in the left-hand drive vehicle. On the other hand, when the vehicle 1 turns right, the longitudinal acceleration in the driver seat DS becomes larger in the left-hand drive vehicle than in the right-hand drive vehicle (see chart (b) of FIG. 7), and thus, when the additional deceleration by the first vehicle posture control is applied to this longitudinal acceleration, rising of the longitudinal acceleration in the driver seat DS by the control tends to be delayed in the left-hand drive vehicle compared with in the right-hand drive vehicle.

In the present embodiment, in order to suppress such a delay of rising of the longitudinal acceleration generated in the driver seat DS by the first vehicle posture control, the additional deceleration set based on the steering speed (step S13 of FIG. 4 and FIG. 5) is changed according to the vehicle-width-direction mounting position of the steering 6 and the operation direction of the steering 6 when the steering angle is increased. That is, the additional deceleration set based on the steering speed is changed so that the longitudinal acceleration generated in the driver seat DS by the first vehicle posture control similarly rises irrespective of the mounting position and operation direction of the steering 6.

Specifically, when the vehicle 1 turns left, the controller 14 increases the additional deceleration (absolute value) in the right-hand drive vehicle compared with in the left-hand drive vehicle. For example, in the right-hand drive vehicle, the controller 14 uses, as a new additional deceleration, a value obtained by multiplying a predetermined gain larger than 1 by the additional deceleration set based on the steering speed, and in the left-hand drive vehicle, the controller 14 uses, as a new additional deceleration, a value obtained by multiplying a predetermined gain less than 1 by the additional deceleration set based on the steering speed. On the other hand, when the vehicle 1 turns right, the controller 14 increases the additional deceleration (absolute value) in the left-hand drive vehicle compared with in the right-hand drive vehicle. For example, in the left-hand drive vehicle, the controller 14 uses, as a new additional deceleration, a value obtained by multiplying a predetermined gain larger than 1 by the additional deceleration set based on the steering speed, and in the right-hand drive vehicle, the controller 14 uses, as a new additional deceleration, a value obtained by multiplying a predetermined gain less than 1 (fixed value) by the additional deceleration set based on the steering speed.

These gains are determined in advance and stored in the memory in the vehicle 1. Specifically, the gain is determined from a prior experiment, simulation, or the like so that the longitudinal acceleration generated in the driver seat DS by the first vehicle posture control becomes constant irrespective of the vehicle-width-direction mounting position of the steering 6 and the operation direction of the steering 6. In one example, a fixed value is applied to the gain.

Note that the information on the vehicle-width-direction mounting position of the steering 6, that is, the information indicating whether the vehicle 1 is a right-hand drive vehicle or a left-hand drive vehicle, is stored in the memory in the vehicle 1 in advance (for example, during production), and the controller 14 changes the additional deceleration based on the information stored in the memory in such a manner. Since the mounting position of the steering 6 is fixed (in other words, the vehicle 1 does not change between a right-hand drive vehicle and a left-hand drive vehicle), after all, in the actual control, the controller 14 does not perform the processing in which the additional deceleration is changed as appropriate according to the mounting position of the steering 6, but changes the additional deceleration according to only the operation direction of the steering 6.

Returning to FIG. 4, the controller 14 proceeds to step S15 after the above-described step S14. In step S15, the controller 14 sets the deceleration torque based on the additional deceleration changed in step S14. Specifically, the controller 14 determines the deceleration torque required to reduce the basic torque so as to achieve the additional deceleration, based on the current vehicle speed, gear stage, road surface slope, and the like which are acquired in step S1 of FIG. 3. After step S15, the controller 14 ends the deceleration torque setting processing and returns to the main routine.

Alternatively, when the steering angle is not increased in step S11 (No in step S11) or when the steering speed is less than the threshold $S_1$ in step S12 (No in step S12), the controller 14 ends the deceleration torque setting processing without setting the deceleration torque and returns to the main routine of FIG. 3. In this case, the deceleration torque becomes 0.

Acceleration Torque Setting Processing

Figure 8:
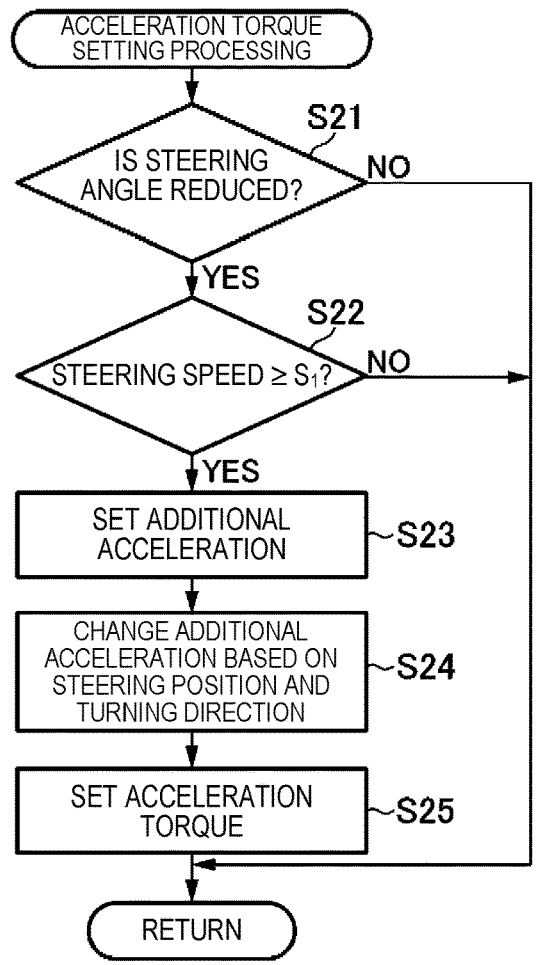
FIG. 8 is a flowchart of acceleration torque setting processing according to the embodiment of the present invention.

Next, the acceleration torque setting processing according to the embodiment of the present invention will be described with reference to FIGS. 8 and 9. FIG. 8 is a flowchart of the acceleration torque setting processing according to the embodiment of the present invention, and FIG. 9 is a map illustrating a relationship between additional acceleration and a steering speed according to the embodiment of the present invention.

When the acceleration torque setting processing is started, in step S21, the controller 14 determines whether the steering angle (absolute value) of the steering apparatus 5 is reduced (that is, whether the returning operation of the steering 6 is being performed). As a result, when the steering angle is reducing (Yes in step S21), the controller 14 proceeds to step S22 and determines whether the steering speed is equal to or more than the predetermined threshold $S_1$. That is, the controller 14 calculates the steering speed based on the steering angle acquired from the steering angle sensor 8 in step S1 of FIG. 3 and determines whether the value is equal to or more than the threshold $S_1$.

As a result, when the steering speed is equal to or more than the threshold $S_1$ (Yes in step S22), the controller 14 proceeds to step S23 and sets the additional acceleration based on the steering speed. This additional acceleration is an acceleration to be added to the vehicle 1 according to the steering operation in order to control the vehicle posture in line with the driver's intention.

Figure 9:
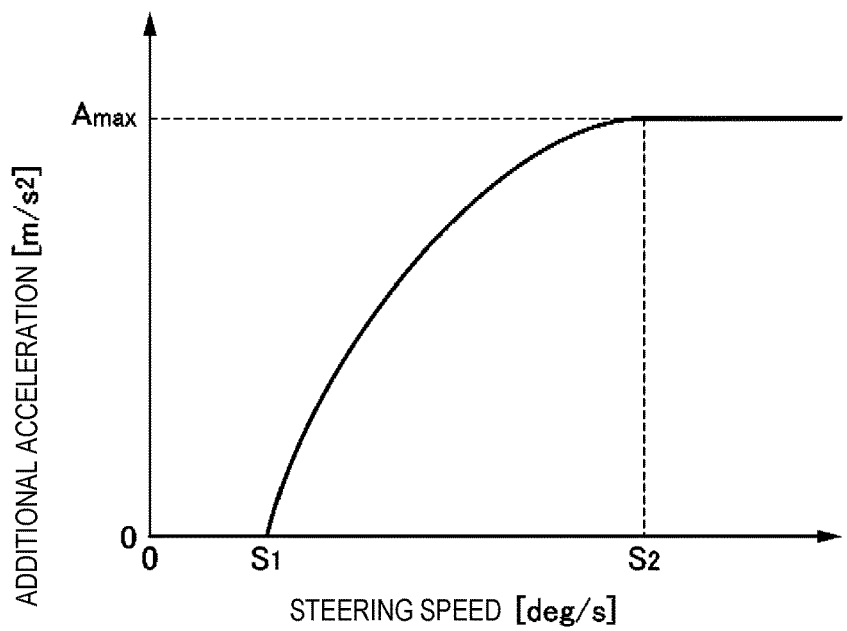
FIG. 9 is a map illustrating a relationship between additional acceleration and a steering speed according to the embodiment of the present invention.

Specifically, the controller 14 sets the additional acceleration corresponding to the steering speed calculated in step S22, based on the relationship between the additional acceleration and the steering speed which is illustrated in the map of FIG. 9. In FIG. 9, the horizontal axis indicates the steering speed and the vertical axis indicates the additional acceleration. As illustrated in FIG. 9, when the steering speed is equal to or less than the threshold $S_1$, the corresponding additional acceleration is 0. That is, when the steering speed is equal to or less than the threshold $S_1$, the controller 14 does not execute the control for adding the acceleration to the vehicle 1 based on the steering operation.

On the other hand, when the steering speed exceeds the threshold $S_1$, the additional acceleration corresponding to this steering speed gradually approximates a predetermined upper limit value $A_{max}$ along with the increase in the steering speed. That is, as the steering speed increases, the additional acceleration increases, and an increase rate of the increase amount decreases. This upper limit value $A_{max}$ is set to acceleration at which the driver does not feel control intervention even when the acceleration is added to the vehicle 1 according to the steering operation (for example, 0.5 m/s$^2$≈0.05 G). Furthermore, when the steering speed is equal to or more than the threshold $S_2$ larger than the threshold $S_1$, the additional acceleration is maintained at the upper limit value $A_{max}$.

Next, in step S24, the controller 14 changes the additional acceleration set in step S23, according to the vehicle-width-direction mounting position of the steering 6 (that is, whether the vehicle 1 is a right-hand drive vehicle or a left-hand drive vehicle) and the operation direction of the steering 6 when the steering angle is reduced (that is, whether the vehicle 1 turns right or left). Here, the reason why the additional acceleration is thus changed will be described with reference to FIG. 10.

Figure 10:
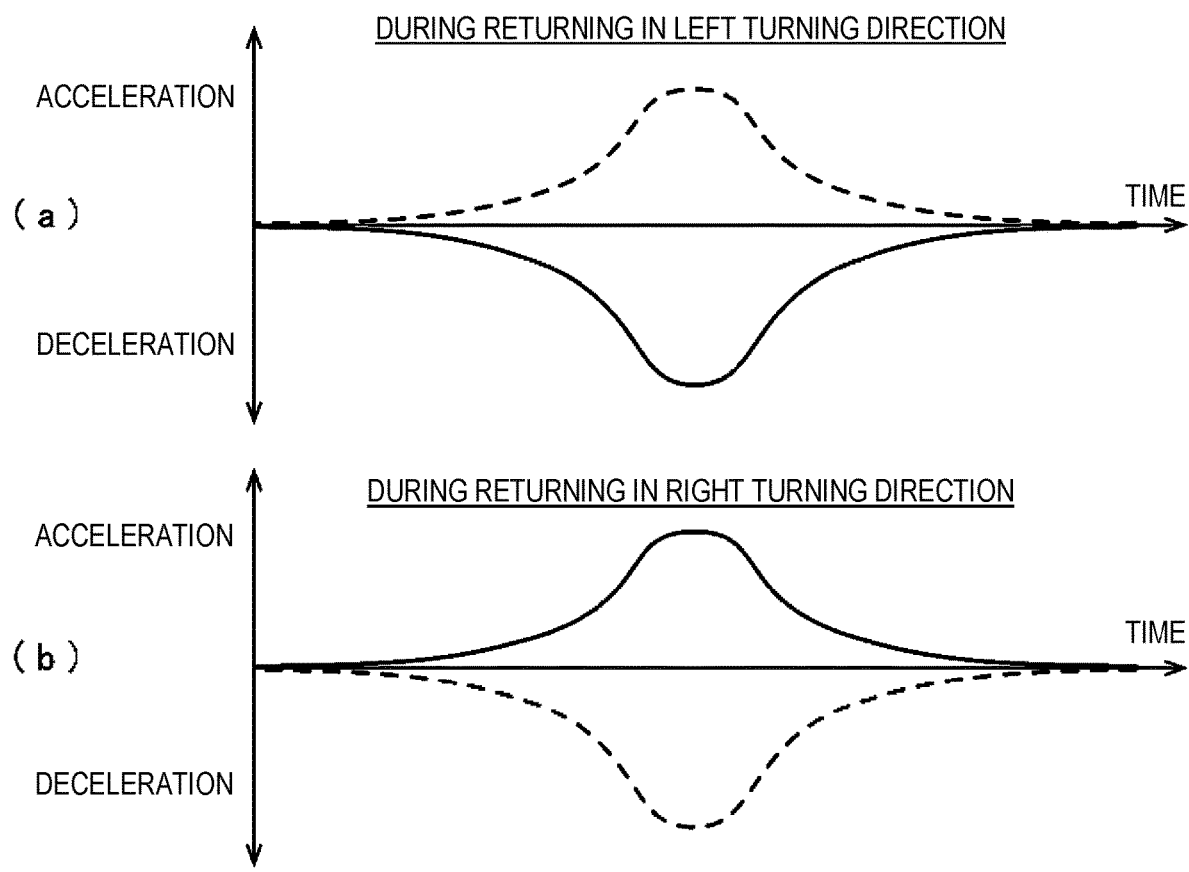
FIG. 10 is an explanatory view of longitudinal acceleration generated in the driver seat during steering returning.

FIG. 10 illustrates an example of longitudinal acceleration generated in the driver seat DS when the steering 6 is returned. Chart (a) of FIG. 10 illustrates longitudinal acceleration (solid line) generated in the driver seat DS of the left-hand drive vehicle and longitudinal acceleration (broken line) generated in the driver seat DS of the right-hand drive vehicle, during steering returning in the left turning direction. Chart (b) of FIG. 10 illustrates longitudinal acceleration (solid line) generated in the driver seat DS of the left-hand drive vehicle and longitudinal acceleration (broken line) generated in the driver seat DS of the right-hand drive vehicle, during steering returning in the right turning direction.

As illustrated in charts (a) and (b) FIG. 10, the longitudinal acceleration generated in the driver seat DS changes according to whether the vehicle 1 is a right-hand drive vehicle or a left-hand drive vehicle and whether the vehicle 1 turns right or left. Specifically, as illustrated in chart (a) of FIG. 10, during steering returning in the left turning direction, the longitudinal acceleration generated in the driver seat DS during the turning becomes smaller in the left-hand drive vehicle than in the right-hand drive vehicle. Specifically, deceleration is generated in the left-hand drive vehicle, while acceleration is generated in the right-hand drive vehicle. In contrast, as illustrated in chart (b) of FIG. 10, during steering returning in the right turning direction, the longitudinal acceleration generated in the driver seat DS during the turning becomes smaller in the right-hand drive vehicle than in the left-hand drive vehicle. Specifically, deceleration is generated in the right-hand drive vehicle, while acceleration is generated in the left-hand drive vehicle.

Accordingly, when the vehicle posture control in which the acceleration is added when the steering 6 is returned (second vehicle posture control) is executed, a difference occurs in rising of the longitudinal acceleration generated in the driver seat DS by this second vehicle posture control, according to whether the vehicle 1 is a right-hand drive vehicle or a left-hand drive vehicle and whether the vehicle 1 turns right or left. Specifically, when the steering 6 is returned in the left turning direction (that is, the vehicle 1 turns left), the longitudinal acceleration in the driver seat DS becomes smaller in the left-hand drive vehicle than in the right-hand drive vehicle (see chart (a) of FIG. 10), and thus, when the additional acceleration by the second vehicle posture control is applied to this longitudinal acceleration, rising of the longitudinal acceleration in the driver seat DS by the control tends to be delayed in the left-hand drive vehicle compared with in the right-hand drive vehicle. On the other hand, when the steering 6 is returned in the right turning direction (that is, the vehicle 1 turns right), the longitudinal acceleration in the driver seat DS becomes smaller in the right-hand drive vehicle than in the left-hand drive vehicle (see chart (b) of FIG. 10), and thus, when the additional acceleration by the second vehicle posture control is applied to this longitudinal acceleration, rising of the longitudinal acceleration in the driver seat DS by the control tends to be delayed in the right-hand drive vehicle compared with in the left-hand drive vehicle.

In the present embodiment, in order to suppress such a delay of rising of the longitudinal acceleration generated in the driver seat DS by the second vehicle posture control, the additional acceleration set based on the steering speed (step S23 of FIG. 8 and FIG. 9) is changed according to the vehicle-width-direction mounting position of the steering 6 and the operation direction of the steering 6 when the steering angle is reduced. That is, the additional acceleration set based on the steering speed is changed so that the longitudinal acceleration generated in the driver seat DS by the second vehicle posture control similarly rises irrespective of the mounting position and operation direction of the steering 6.

Specifically, when the steering 6 is returned in the left turning direction (that is, the vehicle 1 turns left), the controller 14 increases the additional acceleration in the left-hand drive vehicle compared with in the right-hand drive vehicle. For example, in the left-hand drive vehicle, the controller 14 uses, as a new additional acceleration, a value obtained by multiplying a predetermined gain larger than 1 by the additional acceleration set based on the steering speed, and in the right-hand drive vehicle, the controller 14 uses, as a new additional acceleration, a value obtained by multiplying a predetermined gain less than 1 by the additional acceleration set based on the steering speed. On the other hand, when the steering 6 is returned in the right turning direction (that is, the vehicle 1 turns right), the controller 14 increases the additional acceleration in the right-hand drive vehicle compared with in the left-hand drive vehicle. For example, in the right-hand drive vehicle, the controller 14 uses, as a new additional acceleration, a value obtained by multiplying a predetermined gain larger than 1 by the additional acceleration set based on the steering speed, and in the left-hand drive vehicle, the controller 14 uses, as a new additional acceleration, a value obtained by multiplying a predetermined gain less than 1 (fixed value) by the additional acceleration set based on the steering speed.

These gains are determined in advance and stored in the memory in the vehicle 1. Specifically, the gain is determined from a prior experiment, simulation, or the like so that the longitudinal acceleration generated in the driver seat DS by the second vehicle posture control becomes constant irrespective of the vehicle-width-direction mounting position of the steering 6 and the operation direction of the steering 6. In one example, a fixed value is applied to the gain.

Note that the information on the vehicle-width-direction mounting position of the steering 6, that is, the information indicating whether the vehicle 1 is a right-hand drive vehicle or a left-hand drive vehicle, is stored in the memory in the vehicle 1 in advance (for example, during production), and the controller 14 changes the additional acceleration based on the information stored in the memory in such a manner. Since the mounting position of the steering 6 is fixed (in other words, the vehicle 1 does not change between a right-hand drive vehicle and a left-hand drive vehicle), after all, in the actual control, the controller 14 does not perform the processing in which the additional acceleration is changed as appropriate according to the mounting position of the steering 6, but changes the additional acceleration according to only the operation direction of the steering 6.

Returning to FIG. 8, the controller 14 proceeds to step S25 after the above-described step S24. In step S25, the controller 14 sets the acceleration torque based on the additional acceleration changed in step S24. Specifically, the controller 14 determines the acceleration torque required to increase the basic torque so as to achieve the additional acceleration, based on the current vehicle speed, gear stage, road surface slope, and the like which are acquired in step S1. After step S24, the controller 14 ends the acceleration torque setting processing and returns to the main routine of FIG. 3.

Alternatively, when the steering angle is not reduced in step S21 (No in step S21) or when the steering speed is less than the threshold $S_1$ in step S22 (No in step S22), the controller 14 ends the acceleration torque setting processing without setting the acceleration torque and returns to the main routine of FIG. 3. In this case, the acceleration torque becomes 0.

Operations and Effects

Next, operations and effects according to the embodiment of the above-described present invention will be described.

Operations of First Vehicle Posture Control According to the Present Embodiment

First, operations of the first vehicle posture control according to the embodiment of the present invention will be described. Here, operations of the present embodiment will be specifically described with reference to a comparative example with respect to the present embodiment. As described above, in the present embodiment, according to the vehicle-width-direction mounting position of the steering 6 and the operation direction of the steering 6, the deceleration torque by the first vehicle posture control is changed, in other words, the additional deceleration is changed (see step S14 of FIG. 4). In contrast, in the comparative example, according to the mounting position and operation direction of the steering 6, the additional deceleration and the deceleration torque by the first vehicle posture control are not changed.

Figure 11:
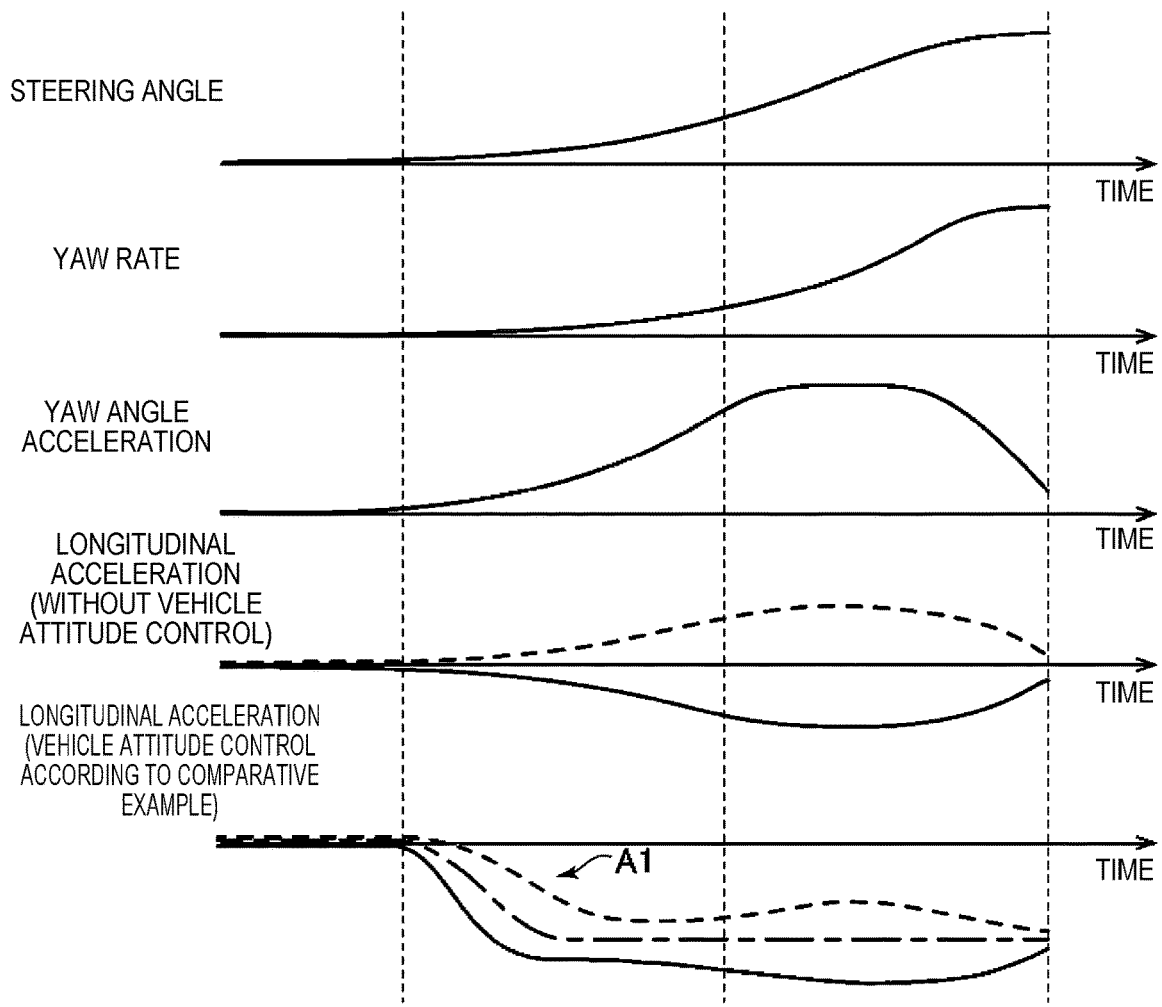
FIG. 11 is a time chart illustrating results in the case of performing first vehicle posture control according to a comparative example.

FIG. 11 is a time chart for describing results in the case of performing first vehicle posture control according to the comparative example. FIG. 11 illustrates, in order from the top, a steering angle, a yaw rate, yaw angle acceleration, longitudinal acceleration in the driver seat DS in the case of not performing the first vehicle posture control, and longitudinal acceleration in the driver seat DS in the case of performing the first vehicle posture control according to the comparative example. In FIG. 11, the solid line indicates the results in the left-hand drive vehicle, and the broken line indicates the results in the right-hand drive vehicle.

Here, a case where the steering 6 is turned in the left turning direction will be exemplified. When the steering 6 is turned in the left turning direction, as illustrated in FIG. 11, the steering angle, the yaw rate, and the yaw angle acceleration change, and the vehicle 1 turns left. When the vehicle 1 thus turns left, as illustrated in FIG. 11, the longitudinal acceleration in the driver seat DS becomes larger in the right-hand drive vehicle (see the broken line) than in the left-hand drive vehicle (see the solid line). Specifically, acceleration is generated in the right-hand drive vehicle, while deceleration is generated in the left-hand drive vehicle (similar to chart (a) of FIG. 7). The longitudinal acceleration generated in the vehicle 1 during turning is determined according to the position in the vehicle 1 (specifically, the distance from the center-of-gravity position G) and the magnitude of the yaw angle acceleration. In particular, the longitudinal acceleration generated in the driver seat DS during turning can be obtained by "left-right distance from the center-of-gravity position G to the driver seat DS×yaw angle acceleration." The left-right distance from the center-of-gravity position G to the driver seat DS is defined as a positive value in the right-hand drive vehicle and defined as a negative value in the left-hand drive vehicle. Furthermore, during left turning, the yaw angle acceleration becomes a positive value. Accordingly, during steering turning in the left turning direction, positive longitudinal acceleration is generated in the right-hand drive vehicle, while negative longitudinal acceleration (deceleration) is generated in the left-hand drive vehicle.

In the comparative example, the additional deceleration as indicated by the one-dot chain line of FIG. 11 is applied to the first vehicle posture control. More specifically, in the comparative example, the additional deceleration is not changed between the right-hand drive vehicle and the left-hand drive vehicle. That is, the same additional deceleration is applied to both the right-hand drive vehicle and the left-hand drive vehicle. As a result, according to the first vehicle posture control of the comparative example, as indicated by arrow A1 in FIG. 11, rising of the longitudinal acceleration in the driver seat DS is delayed in the right-hand drive vehicle (see the broken line) compared with in the left-hand drive vehicle (see the solid line). That is, as described above, during left turning, the longitudinal acceleration in the driver seat DS becomes larger in the right-hand drive vehicle than in the left-hand drive vehicle, and thus, in the right and left hand drive vehicles, when the same additional deceleration is applied to this longitudinal acceleration by the first vehicle posture control, rising of the longitudinal acceleration in the driver seat DS by the control is delayed in the right-hand drive vehicle compared with in the left-hand drive vehicle. Note that the change in the longitudinal acceleration as indicated by arrow A1 in FIG. 11 is, strictly speaking, "falling," but it can also be said that the longitudinal acceleration is rising in the negative direction; accordingly, such a change in the longitudinal acceleration is expressed as "rising" in the present description.

Figure 12:
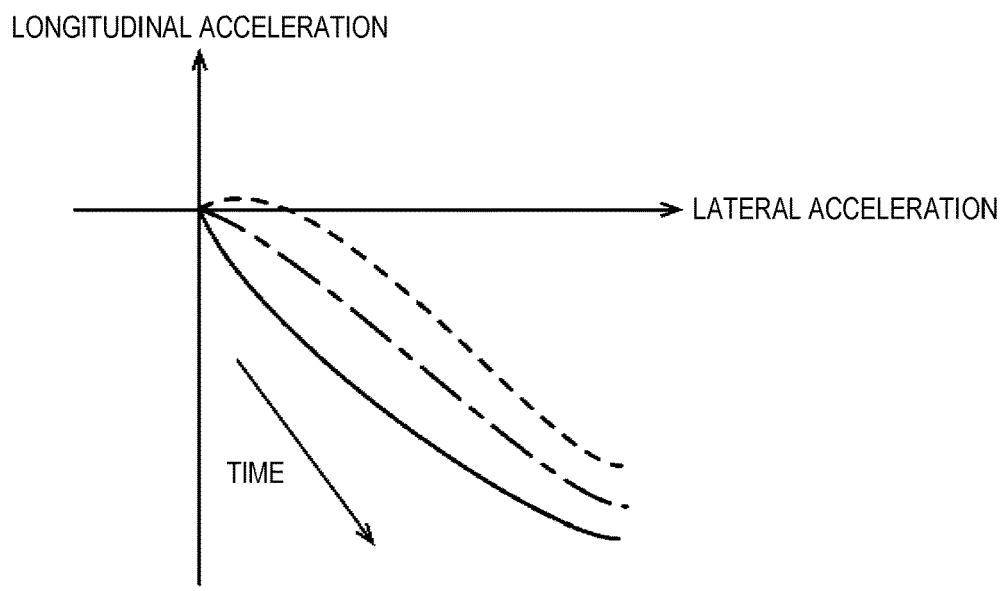
FIG. 12 is an explanatory view of a relationship between lateral acceleration and longitudinal acceleration in the case of performing the first vehicle posture control according to the comparative example.

Next, FIG. 12 is an explanatory view of a relationship between lateral acceleration (horizontal axis) and longitudinal acceleration (vertical axis) in the case of performing the first vehicle posture control according to the comparative example. FIG. 12 corresponds to a view in which a portion indicated by arrow A1 of FIG. 11 is enlarged. Accordingly, what is meant by each of the solid line, the broken line, and the one-dot chain line is the same as in FIG. 11. As also illustrated in this FIG. 12, rising is delayed in the longitudinal acceleration generated in the driver seat DS of the right-hand drive vehicle during left turning (see the broken line) compared with in the longitudinal acceleration generated in the driver seat DS of the left-hand drive vehicle during left turning (see the solid line). Specifically, rising of the longitudinal acceleration is delayed in the relationship with the lateral acceleration. Linkage (balance) between the longitudinal acceleration and the lateral acceleration which are generated by the first vehicle posture control is lost by such a delay of rising. As a result, according to the comparative example, a driver fatigue reduction effect of the first vehicle posture control is not secured appropriately.

Figure 13:
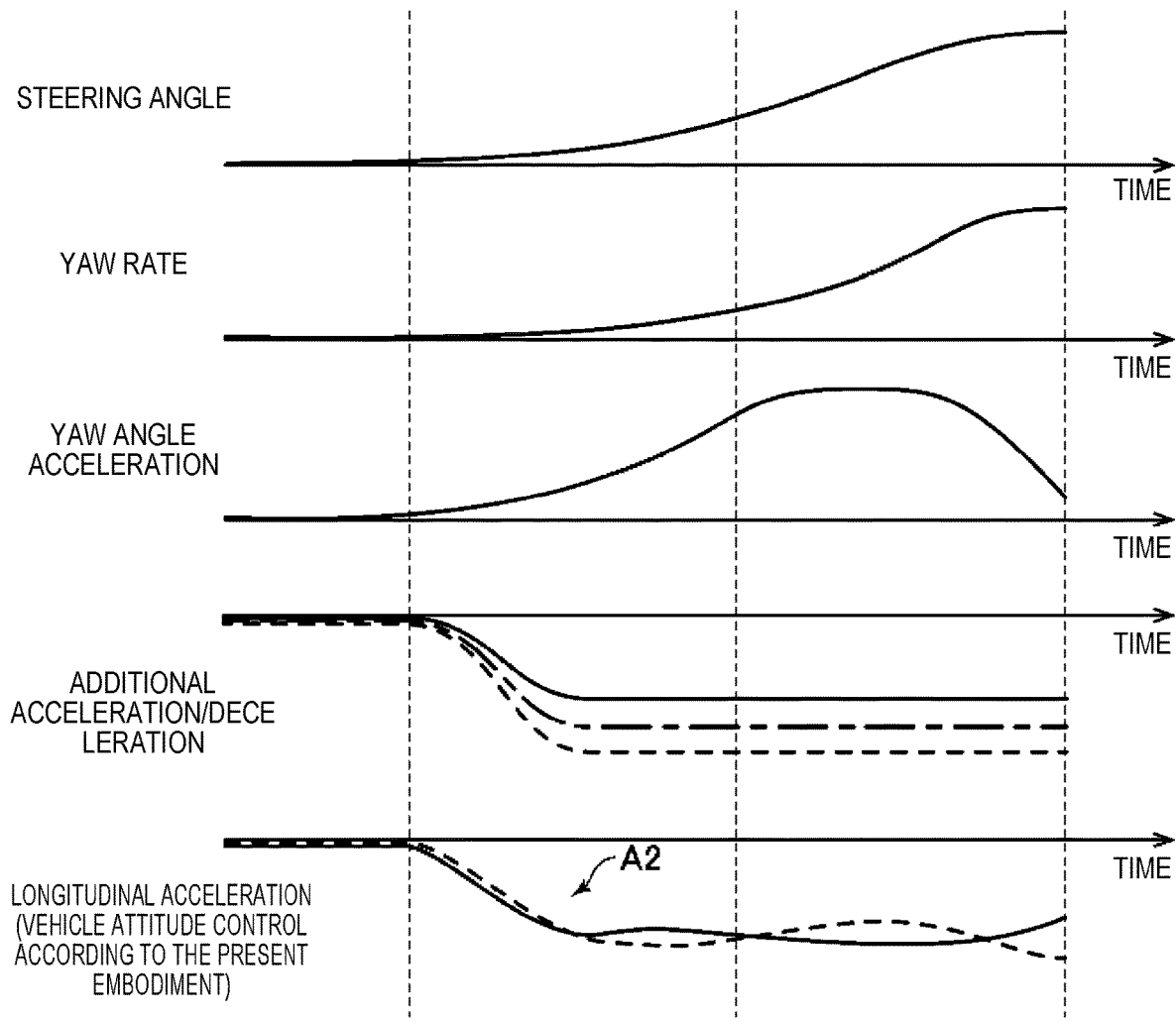
FIG. 13 is a time chart illustrating results in the case of performing first vehicle posture control according to the embodiment of the present invention.

Next, FIG. 13 is a time chart for describing results in the case of performing the first vehicle posture control according to the embodiment of the present invention. FIG. 13 illustrates, in order from the top, a steering angle, a yaw rate, yaw angle acceleration, additional deceleration applied by the first vehicle posture control according to the present embodiment, and longitudinal acceleration in the driver seat DS in the case of performing the first vehicle posture control according to the present embodiment. In FIG. 13, the solid line indicates the results in the left-hand drive vehicle, and the broken line indicates the results in the right-hand drive vehicle.

Here, a case where the steering 6 is turned in the left turning direction will be exemplified. When the steering 6 is turned in the left turning direction, as illustrated in FIG. 13, the steering angle, the yaw rate, and the yaw angle acceleration change, and the vehicle 1 turns left. In the present embodiment, in the case of performing the first vehicle posture control when the vehicle 1 thus turns left, as illustrated in FIG. 13, the additional deceleration (absolute value) to be applied to the right-hand drive vehicle is increased compared with the additional deceleration (absolute value) to be applied to the left-hand drive vehicle. Specifically, in the right-hand drive vehicle, the controller 14 uses, as a new additional deceleration (see the broken line), a value obtained by multiplying a predetermined gain larger than 1 by the additional deceleration set based on the steering speed (see the one-dot chain line), and in the left-hand drive vehicle, the controller 14 uses, as a new additional deceleration (see the solid line), a value obtained by multiplying a predetermined gain less than 1 by the additional deceleration set based on the steering speed (see the one-dot chain line).

According to the present embodiment as described above, the larger additional deceleration (absolute value) is applied to the right-hand drive vehicle than to the left-hand drive vehicle, so that, as indicated by arrow A2 in FIG. 13, rising of the longitudinal acceleration in the driver seat DS by the first vehicle posture control becomes almost the same in the right-hand drive vehicle and the left-hand drive vehicle. That is, according to the present embodiment, the delay of rising of the longitudinal acceleration as described in the comparative example (see FIG. 11) can be resolved appropriately. Thus, linkage (balance) between the longitudinal acceleration and the lateral acceleration which are generated by the first vehicle posture control can be secured. Therefore, according to the present embodiment, the driver fatigue reduction effect of the first vehicle posture control can be secured appropriately.

Although in FIGS. 11 to 13, the case of performing the first vehicle posture control when the steering 6 is turned in the left turning direction has been exemplified, the same results can also be obtained in the case of performing the first vehicle posture control when the steering 6 is turned in the right turning direction.

Operations of Second Vehicle Posture Control According to the Present Embodiment Next, operations of the second vehicle posture control according to the embodiment of the present invention will be described. Here, operations of the present embodiment will be specifically described with reference to a comparative example with respect to the present embodiment. As described above, in the present embodiment, according to the vehicle-width-direction mounting position of the steering 6 and the operation direction of the steering 6, the acceleration torque by the second vehicle posture control is changed, in other words, the additional acceleration is changed (see step S24 of FIG. 8). In contrast, in the comparative example, according to the mounting position and operation direction of the steering 6, the additional acceleration and the acceleration torque by the second vehicle posture control are not changed.

Figure 14:
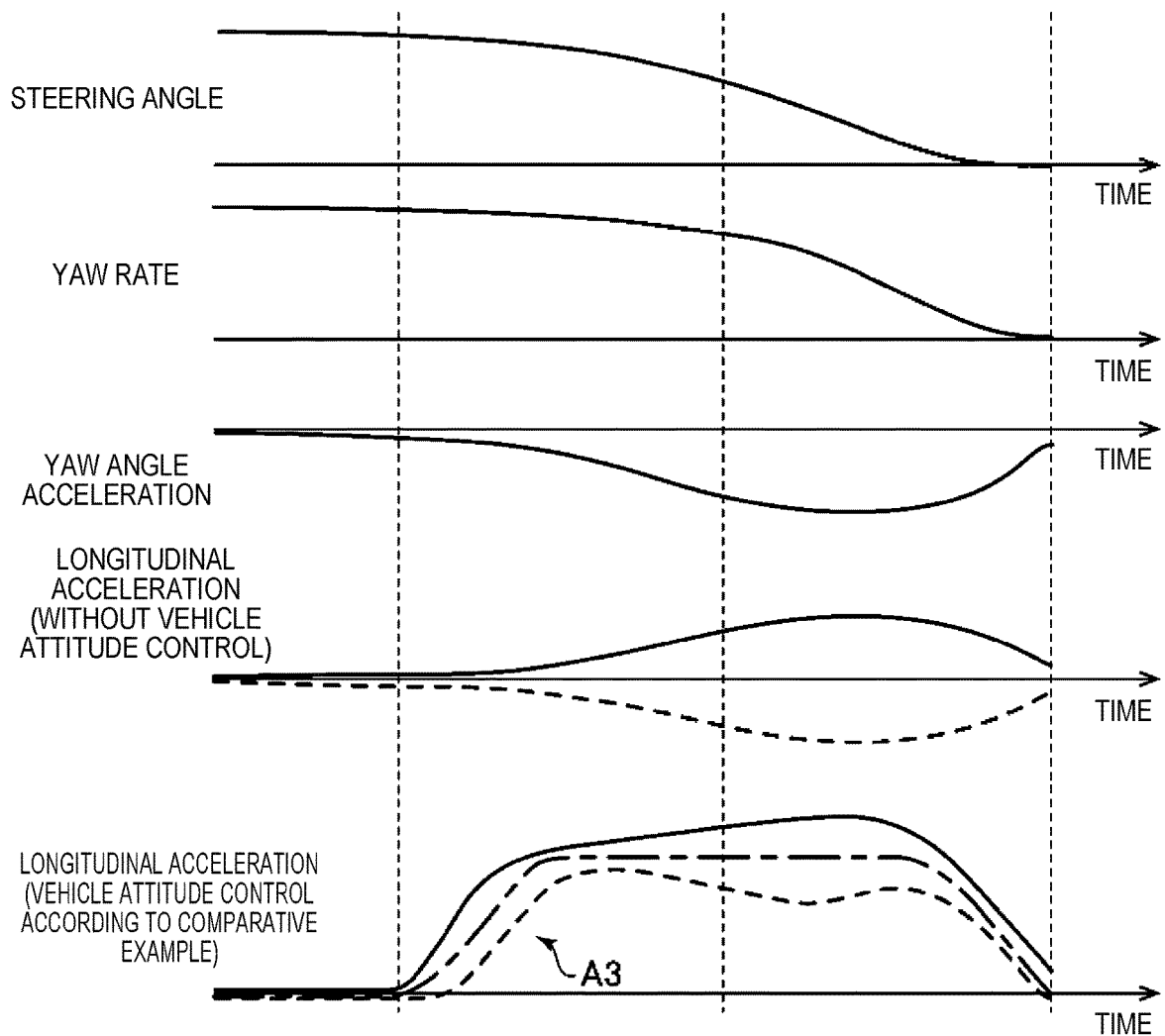
FIG. 14 is a time chart illustrating results in the case of performing second vehicle posture control according to a comparative example.

FIG. 14 is a time chart for describing results in the case of performing second vehicle posture control according to the comparative example. FIG. 14 illustrates, in order from the top, a steering angle, a yaw rate, yaw angle acceleration, longitudinal acceleration in the driver seat DS in the case of not performing the second vehicle posture control, and longitudinal acceleration in the driver seat DS in the case of performing the second vehicle posture control according to the comparative example. In FIG. 14, the solid line indicates the results in the left-hand drive vehicle, and the broken line indicates the results in the right-hand drive vehicle.

Here, a case where the steering 6 turned in the left turning direction is returned in the right turning direction will be exemplified. When the steering 6 is returned in the right turning direction, as illustrated in FIG. 14, the steering angle, the yaw rate, and the yaw angle acceleration change, and the vehicle 1 turns right. When the vehicle 1 thus turns right, as illustrated in FIG. 14, the longitudinal acceleration in the driver seat DS becomes smaller in the right-hand drive vehicle (see the broken line) than in the left-hand drive vehicle (see the solid line). Specifically, deceleration is generated in the right-hand drive vehicle, while acceleration is generated in the left-hand drive vehicle (similar to chart (b) of FIG. 10). As described above, the longitudinal acceleration generated in the driver seat DS during turning can be obtained by "left-right distance from the center-of-gravity position G to the driver seat DS×yaw angle acceleration." The left-right distance from this center-of-gravity position G to the driver seat DS is defined as a positive value in the right-hand drive vehicle and defined as a negative value in the left-hand drive vehicle. Furthermore, during right turning, the yaw angle acceleration becomes a negative value. Accordingly, during steering returning in the right turning direction, negative longitudinal acceleration (deceleration) is generated in the right-hand drive vehicle, while positive longitudinal acceleration is generated in the left-hand drive vehicle.

In the comparative example, the additional acceleration as indicated by the one-dot chain line of FIG. 14 is applied to the second vehicle posture control. More specifically, in the comparative example, the additional acceleration is not changed between the right-hand drive vehicle and the left-hand drive vehicle. That is, the same additional acceleration is applied to both the right-hand drive vehicle and the left-hand drive vehicle. As a result, according to the second vehicle posture control of the comparative example, as indicated by arrow A3 in FIG. 14, rising of the longitudinal acceleration in the driver seat DS is delayed in the right-hand drive vehicle (see the broken line) compared with in the left-hand drive vehicle (see the solid line). That is, as described above, during right turning, the longitudinal acceleration in the driver seat DS becomes smaller in the right-hand drive vehicle than in the left-hand drive vehicle, and thus, in the right and left hand drive vehicles, when the same additional acceleration is applied to this longitudinal acceleration by the second vehicle posture control, rising of the longitudinal acceleration in the driver seat DS by the control is delayed in the right-hand drive vehicle compared with in the left-hand drive vehicle.

Figure 15:
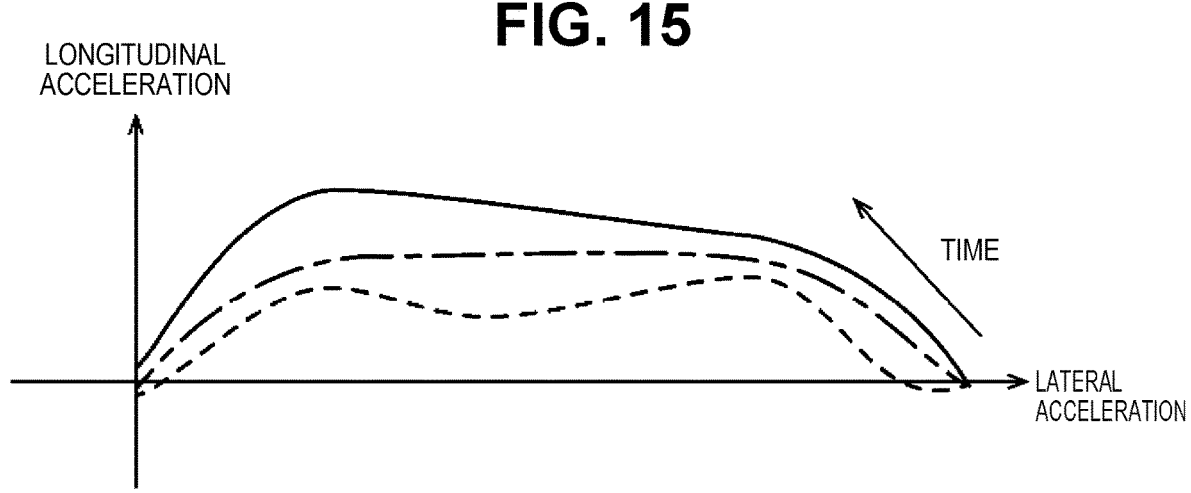
FIG. 15 is an explanatory view of a relationship between lateral acceleration and longitudinal acceleration in the case of performing the second vehicle posture control according to the comparative example.

Next, FIG. 15 is an explanatory view of a relationship between lateral acceleration (horizontal axis) and longitudinal acceleration (vertical axis) in the case of performing the second vehicle posture control according to the comparative example. FIG. 15 corresponds to the lowermost view of FIG. 14. Accordingly, what is meant by each of the solid line, the broken line, and the one-dot chain line is the same as in FIG. 14. As also illustrated in this FIG. 15, rising is delayed in the longitudinal acceleration generated in the driver seat DS of the right-hand drive vehicle during right turning (see the broken line) compared with in the longitudinal acceleration generated in the driver seat DS of the left-hand drive vehicle during right turning (see the solid line). Specifically, rising of the longitudinal acceleration is delayed in the relationship with the lateral acceleration. Linkage (balance) between the longitudinal acceleration and the lateral acceleration which are generated by the second vehicle posture control is lost by such a delay of rising. As a result, according to the comparative example, a driver fatigue reduction effect of the second vehicle posture control is not secured appropriately.

Next, FIG. 16 is a time chart for describing results in the case of performing the second vehicle posture control according to the embodiment of the present invention. FIG. 16 illustrates, in order from the top, a steering angle, a yaw rate, yaw angle acceleration, additional acceleration applied by the second vehicle posture control according to the present embodiment, and longitudinal acceleration in the driver seat DS in the case of performing the second vehicle posture control according to the present embodiment. In FIG. 16, the solid line indicates the results in the left-hand drive vehicle, and the broken line indicates the results in the right-hand drive vehicle.

Here, a case where the steering 6 turned in the left turning direction is returned in the right turning direction will be exemplified. When the steering 6 is returned in the right turning direction, as illustrated in FIG. 16, the steering angle, the yaw rate, and the yaw angle acceleration change, and the vehicle 1 turns right. In the present embodiment, in the case of performing the second vehicle posture control when the vehicle 1 thus turns right, as illustrated in FIG. 16, the additional acceleration to be applied to the right-hand drive vehicle is increased compared with the additional acceleration to be applied to the left-hand drive vehicle. Specifically, in the right-hand drive vehicle, the controller 14 uses, as a new additional acceleration (see the broken line), a value obtained by multiplying a predetermined gain larger than 1 by the additional acceleration set based on the steering speed (see the one-dot chain line), and in the left-hand drive vehicle, the controller 14 uses, as a new additional acceleration (see the solid line), a value obtained by multiplying a predetermined gain less than 1 by the additional acceleration set based on the steering speed (see the one-dot chain line).

According to the present embodiment as described above, the larger additional acceleration is applied to the right-hand drive vehicle than to the left-hand drive vehicle, so that, as indicated by arrow A4 in FIG. 16, rising of the longitudinal acceleration in the driver seat DS by the second vehicle posture control becomes almost the same in the right-hand drive vehicle and the left-hand drive vehicle. That is, according to the present embodiment, the delay of rising of the longitudinal acceleration as described in the comparative example (see FIG. 14) can be resolved appropriately. Thus, linkage (balance) between the longitudinal acceleration and the lateral acceleration which are generated by the second vehicle posture control can be secured. Therefore, according to the present embodiment, the driver fatigue reduction effect of the second vehicle posture control can be secured appropriately.

Although in FIGS. 14 to 16, the case of performing the second vehicle posture control when the steering 6 is returned in the right turning direction has been exemplified, the same results can also be obtained in the case of performing the second vehicle posture control when the steering 6 is returned in the left turning direction.

Effects of the Present Embodiment

As described above, in the present embodiment, in the case of performing the first vehicle posture control in which the deceleration torque is added according to the increase in the steering angle (that is, the turning operation of the steering 6), the deceleration torque by the first vehicle posture control is changed based on the vehicle-width-direction mounting position of the steering 6 and the operation direction of the steering 6 when the steering angle is increased. Thus, rising of the longitudinal acceleration in the driver seat DS by the first vehicle posture control can be made almost constant irrespective of the mounting position and operation direction of the steering 6. That is, according to the present embodiment, the delay of rising of the longitudinal acceleration in the driver seat DS by the first vehicle posture control can be resolved appropriately. Accordingly, according to the present embodiment, linkage (balance) between the longitudinal acceleration and the lateral acceleration which are generated by the first vehicle posture control can be secured, and the driver fatigue reduction effect of the first vehicle posture control can be secured appropriately.

More specifically, in the present embodiment, when the vehicle 1 is the right-hand drive vehicle, during the increase in the steering angle, in the case where the steering 6 is operated in the left turning direction, the deceleration torque is increased compared with in the case where the steering 6 is operated in the right turning direction, so that the longitudinal acceleration by the first vehicle posture control can be appropriately generated in the driver seat DS of the right-hand drive vehicle.

Alternatively, in the present embodiment, when the vehicle 1 is the left-hand drive vehicle, during the increase in the steering angle, in the case where the steering 6 is operated in the left turning direction, the deceleration torque is reduced compared with in the case where the steering 6 is operated in the right turning direction, so that the longitudinal acceleration by the first vehicle posture control can be appropriately generated in the driver seat DS of the left-hand drive vehicle.

Furthermore, in the present embodiment, in the case of performing the second vehicle posture control in which the acceleration torque is added according to the reduction in the steering angle (that is, the returning operation of the steering 6), the acceleration torque by the second vehicle posture control is changed based on the vehicle-width-direction mounting position of the steering 6 and the operation direction of the steering 6 when the steering angle is reduced. Thus, rising of the longitudinal acceleration in the driver seat DS by the second vehicle posture control can be made almost constant irrespective of the mounting position and operation direction of the steering 6. That is, according to the present embodiment, the delay of rising of the longitudinal acceleration in the driver seat DS by the second vehicle posture control can be resolved appropriately. Accordingly, according to the present embodiment, linkage (balance) between the longitudinal acceleration and the lateral acceleration which are generated by the second vehicle posture control can be secured, and the driver fatigue reduction effect of the second vehicle posture control can be secured appropriately.

More specifically, in the present embodiment, when the vehicle 1 is the right-hand drive vehicle, during the reduction in the steering angle, in the case where the steering 6 is operated in the left turning direction, the acceleration torque is reduced compared with in the case where the steering 6 is operated in the right turning direction, so that the longitudinal acceleration by the second vehicle posture control can be appropriately generated in the driver seat DS of the right-hand drive vehicle.

Alternatively, in the present embodiment, when the vehicle 1 is the left-hand drive vehicle, during the reduction in the steering angle, in the case where the steering 6 is operated in the left turning direction, the acceleration torque is increased compared with in the case where the steering 6 is operated in the right turning direction, so that the longitudinal acceleration by the second vehicle posture control can be appropriately generated in the driver seat DS of the left-hand drive vehicle.

MODIFICATIONS

Hereinafter, a modification of the above-described embodiment will be described.

Modification 1

Although in the above-described embodiment, the case where the engine 4 is a gasoline engine has been described, in another example, the present invention is also applicable to a diesel engine (the engine does not have the spark plug 43 and the like). In this example, when the final target torque is set by subtracting the deceleration torque from the basic torque in step S6 of FIG. 3, that is, when the first vehicle posture control is performed, the controller 14 may reduce the fuel injection amount of the injector of the diesel engine compared with the fuel injection amount for generating the basic torque. In contrast, when the final target torque is set by adding the acceleration torque to the basic torque in step S6, that is, when the second vehicle posture control is performed, the controller 14 may increase the fuel injection amount of the injector compared with the fuel injection amount for generating the basic torque.

Furthermore, in another example, the present invention is also applicable to the vehicle 1 having a motor generator. That is, the motor generator (which may be simply a motor (electric motor)) may be used as a prime mover. In this example, instead of or in addition to the control of the engine 4 as described above, the motor generator may be controlled so as to achieve the final target torque set in step S6 of FIG. 3. Specifically, in the case of performing the first vehicle posture control in which the deceleration torque is added to the vehicle 1, the controller 14 may reduce the torque to be generated by the motor generator. In contrast, in the case of performing the second vehicle posture control in which the acceleration torque is added to the vehicle 1, the controller 14 may increase the torque to be generated by the motor generator.

Furthermore, in another example, in the case of performing the first vehicle posture control, the controller 14 may control the brake apparatus 16 so that the braking torque corresponding to the deceleration torque is added to the vehicle 1. Alternatively, the controller 14 may cause the motor generator to perform regenerative power generation so that the regenerative torque (which becomes the braking torque) generated by the motor generator is added to the vehicle 1.

Furthermore, in another example, in the case of performing the second vehicle posture control, when the vehicle 1 is braked by the brake apparatus 16, the controller 14 may control the brake apparatus 16 so that the braking torque to be added to the vehicle 1 is reduced, to thereby achieve the acceleration torque by the second vehicle posture control. In addition, in the case of performing the second vehicle posture control, when the vehicle 1 is braked by the regenerative torque of the motor generator, the controller 14 may control the motor generator so that the regenerative torque to be added to the vehicle 1 is reduced, to thereby achieve the acceleration torque by the second vehicle posture control.

Modification 2

In the above-described embodiment, the additional deceleration and the additional acceleration are changed according to the vehicle-width-direction mounting position of the steering 6 and the operation direction of the steering 6, and the deceleration torque and the acceleration torque are set based on the additional deceleration and the additional acceleration after the change. In this embodiment, the deceleration torque and the acceleration torque are indirectly changed according to the mounting position and operation direction of the steering 6. In another example, the deceleration torque and the acceleration torque may be directly changed according to the mounting position and operation direction of the steering 6 without changing the additional deceleration and the additional acceleration.

Modification 3

Although in the above-described embodiment, the vehicle posture control is executed based on the steering angle and the steering speed, in another example, the vehicle posture control may be executed based on a yaw rate, lateral acceleration, yaw acceleration, or lateral jerk, instead of the steering angle and the steering speed.

REFERENCE SIGNS LIST 1 vehicle
4 engine
5 steering apparatus
6 steering wheel
8 steering angle sensor
10 accelerator opening sensor
12 vehicle speed sensor
13 acceleration sensor
14 controller
16 brake apparatus
18 brake control system
41 throttle valve
42 injector
43 spark plug
DS driver seat
G center-of-gravity position #

The invention claimed is:

1. A vehicle control method for controlling a vehicle in which a front wheel is driven by a prime mover, the vehicle control method being characterized by comprising:
   a basic torque setting step of setting basic torque to be generated by the prime mover, based on an operational state of the vehicle;
   a deceleration torque setting step of setting deceleration torque, based on an increase in steering angle of a steering apparatus mounted on the vehicle;
   a torque generation step of controlling the prime mover so that torque based on the basic torque and the deceleration torque is generated; and
   a deceleration torque changing step of changing the deceleration torque, based on a vehicle-width-direction mounting position of a steering wheel of the steering apparatus and an operation direction of the steering wheel when the steering angle is increased.

2. The vehicle control method according to claim 1, wherein the vehicle is a right-hand drive vehicle in which the steering wheel is mounted on a right side relative to a width-direction center of the vehicle, and
   in the deceleration torque changing step, when the steering angle is increased, in a case where the steering wheel is operated in a direction of causing the vehicle to turn left, the deceleration torque is increased compared with in a case where the steering wheel is operated in a direction of causing the vehicle to turn right.

3. The vehicle control method according to claim 2, further comprising an acceleration torque setting step of setting acceleration torque, based on a reduction in the steering angle of the steering apparatus, wherein in the torque generation step, the prime mover is controlled so that torque based on the basic torque and the acceleration torque is generated.

4. The vehicle control method according to claim 3, further comprising an acceleration torque changing step of changing the acceleration torque, based on a vehicle-width-direction mounting position of the steering wheel and an operation direction of the steering wheel when the steering angle is reduced.

5. The vehicle control method according to claim 4, wherein the vehicle is a right-hand drive vehicle in which the steering wheel is mounted on a right side relative to a width-direction center of the vehicle, and in the acceleration torque changing step, when the steering angle is reduced, in a case where the steering wheel is operated in a direction of causing the vehicle to turn left, the acceleration torque is reduced compared with in a case where the steering wheel is operated in a direction of causing the vehicle to turn right.

6. The vehicle control method according to claim 1, wherein the vehicle is a left-hand drive vehicle in which the steering wheel is mounted on a left side relative to a width-direction center of the vehicle, and in the deceleration torque changing step, when the steering angle is increased, in a case where the steering wheel is operated in a direction of causing the vehicle to turn left, the deceleration torque is reduced compared with in a case where the steering wheel is operated in a direction of causing the vehicle to turn right.

7. The vehicle control method according to claim 6, further comprising an acceleration torque setting step of setting acceleration torque, based on a reduction in the steering angle of the steering apparatus, wherein in the torque generation step, the prime mover is controlled so that torque based on the basic torque and the acceleration torque is generated.

8. The vehicle control method according to claim 7, further comprising an acceleration torque changing step of changing the acceleration torque, based on a vehicle-width-direction mounting position of the steering wheel and an operation direction of the steering wheel when the steering angle is reduced.

9. The vehicle control method according to claim 8, in the acceleration torque changing step, when the steering angle is reduced, in a case where the steering wheel is operated in a direction of causing the vehicle to turn left, the acceleration torque is increased compared with in a case where the steering wheel is operated in a direction of causing the vehicle to turn right.

10. The vehicle control method according to claim 1, further comprising an acceleration torque setting step of setting acceleration torque, based on a reduction in the steering angle of the steering apparatus, wherein in the torque generation step, the prime mover is controlled so that torque based on the basic torque and the acceleration torque is generated.

11. The vehicle control method according to claim 10, further comprising an acceleration torque changing step of changing the acceleration torque, based on a vehicle-width-direction mounting position of the steering wheel and an operation direction of the steering wheel when the steering angle is reduced.

12. The vehicle control method according to claim 11, in the acceleration torque changing step, when the steering angle is reduced, in a case where the steering wheel is operated in a direction of causing the vehicle to turn left, the acceleration torque is reduced compared with in a case where the steering wheel is operated in a direction of causing the vehicle to turn right.

13. The vehicle control method according to claim 11, wherein the vehicle is a left-hand drive vehicle in which the steering wheel is mounted on a left side relative to a width-direction center of the vehicle, and in the acceleration torque changing step, when the steering angle is reduced, in a case where the steering wheel is operated in a direction of causing the vehicle to turn left, the acceleration torque is increased compared with in a case where the steering wheel is operated in a direction of causing the vehicle to turn right.

14. A vehicle system for controlling a vehicle, the vehicle system being characterized by comprising:

a prime mover that drives a front wheel of the vehicle;

a steering apparatus including a steering wheel for steering the vehicle;

a steering angle sensor that detects a steering angle of the steering apparatus;

an operational state sensor that detects an operational state of the vehicle; and a controller that controls the prime mover, wherein the controller is configured to:

set basic torque to be generated by the prime mover, based on the operational state detected by the operational state sensor;

set deceleration torque, based on an increase in the steering angle detected by the steering angle sensor;

control the prime mover so that torque based on the basic torque and the deceleration torque is generated; and change the deceleration torque, based on a vehicle-width-direction mounting position of the steering wheel and an operation direction of the steering wheel when the steering angle is increased.

15. A vehicle control apparatus for controlling a vehicle comprising a steering apparatus comprising a steering wheel, the vehicle being configured as a left-hand drive vehicle in which this steering wheel is mounted on a left side relative to a width-direction center of the vehicle, the vehicle control apparatus being characterized by comprising:

vehicle posture control means that adds, when a steering angle of the steering apparatus is increased, deceleration to the vehicle to thereby control a vehicle posture; and deceleration changing means that changes the deceleration to be added by the vehicle posture control means, based on an operation direction of the steering wheel when the steering angle is increased.

* * * * *